United States Patent
Keely et al.

(10) Patent No.: US 9,830,056 B1
(45) Date of Patent: Nov. 28, 2017

(54) INDICATING RELATIONSHIPS BETWEEN WINDOWS ON A COMPUTING DEVICE

(71) Applicant: Google Inc., Mountain View, CA (US)

(72) Inventors: Lee Brandon Keely, San Francisco, CA (US); Matias Gonzalo Duarte, Mountain View, CA (US); Daniel Marc Gatan Shiplacoff, Los Altos, CA (US); Michael Andrew Cleron, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 244 days.

(21) Appl. No.: 14/198,321

(22) Filed: Mar. 5, 2014

Related U.S. Application Data

(60) Provisional application No. 61/930,341, filed on Jan. 22, 2014.

(51) Int. Cl.
*G06F 3/048* (2013.01)
*G06F 3/0484* (2013.01)

(52) U.S. Cl.
CPC .................. *G06F 3/04842* (2013.01)

(58) Field of Classification Search
CPC ..................................................... G06F 3/0481
See application file for complete search history.

(56) References Cited

U.S. PATENT DOCUMENTS

| | | | | |
|---|---|---|---|---|
| 5,461,710 A | * | 10/1995 | Bloomfield | G06F 3/0483 715/775 |
| 2004/0239701 A1 | * | 12/2004 | Crichton | G06F 3/1454 715/853 |
| 2006/0161861 A1 | * | 7/2006 | Holecek | G06F 17/30994 715/782 |
| 2006/0184894 A1 | * | 8/2006 | Daniels | G06F 3/0482 715/783 |
| 2008/0307360 A1 | * | 12/2008 | Chaudhri | G06F 3/0481 715/835 |

(Continued)

FOREIGN PATENT DOCUMENTS

EP  0567418 A2  3/1993

OTHER PUBLICATIONS

"Manage multiple windows", Microsoft [online]. First Accessed on Nov. 4, 2013. Retrieved from the Internet: <windows.microsoft.com/en-us/windows7/manage-multiple-windows> 4pgs.

(Continued)

*Primary Examiner* — Kevin L Young
*Assistant Examiner* — Parmandand Patel
(74) *Attorney, Agent, or Firm* — Shumaker & Sieffert, P.A.

(57) ABSTRACT

A computing device outputs an arrangement of a set of windows organized into one or more visual stacks. Each respective visual stack from the one or more visual stacks comprises a respective subset of the set of windows sequenced based on a characteristic. The computing device determines that a first window from the set of windows has a particular relationship with a second window from the set of windows, wherein the particular relationship is not based on the characteristic. The computing device outputs, responsive to the determining, a visual indication of the first window that visually differentiates the first window from windows from the set of windows not having the particular relationship with the second window.

17 Claims, 15 Drawing Sheets

(56) References Cited

U.S. PATENT DOCUMENTS

2011/0202877 A1* 8/2011 Lassonde .............. G06F 3/0482
 715/817

OTHER PUBLICATIONS

"Touch: Swipe, tap, and beyond", Microsoft [online]. First Accessed on Nov. 4, 2013. Retrieved from the Internet: <windows.microsoft.com/en-us/windows-8/touch-swipe-tap-beyond> 3 pgs.
"Ubuntu on tablets", Canonical Ltd. [online]. First Accessed on Nov. 4, 2013. Retrieved from the Internet: <www.ubuntu.com/tablet> 8 pgs.

* cited by examiner

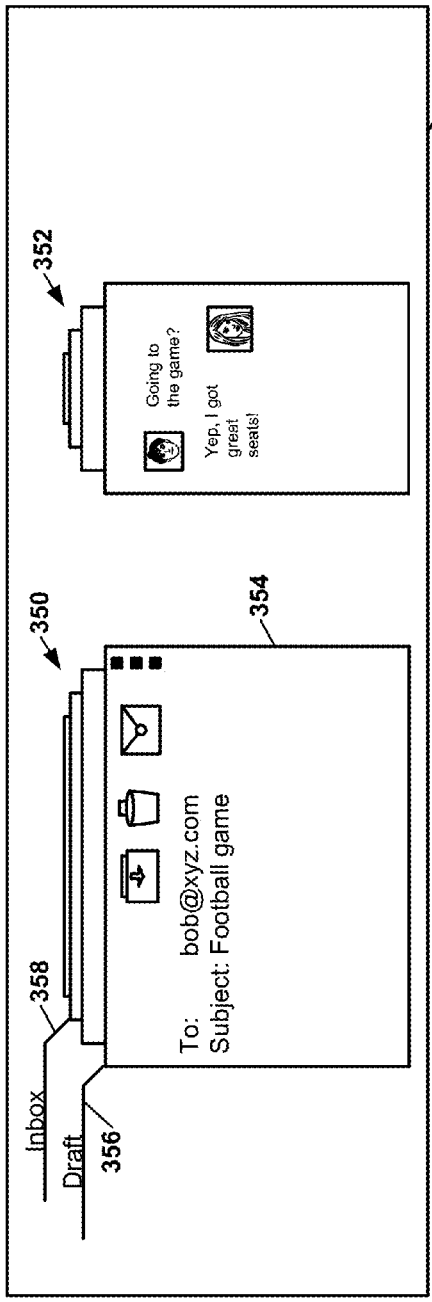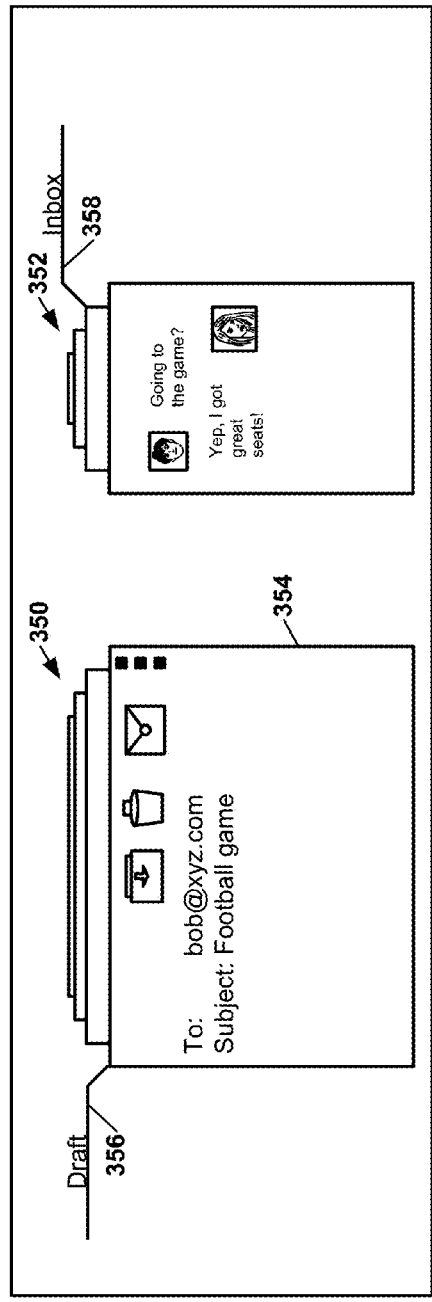

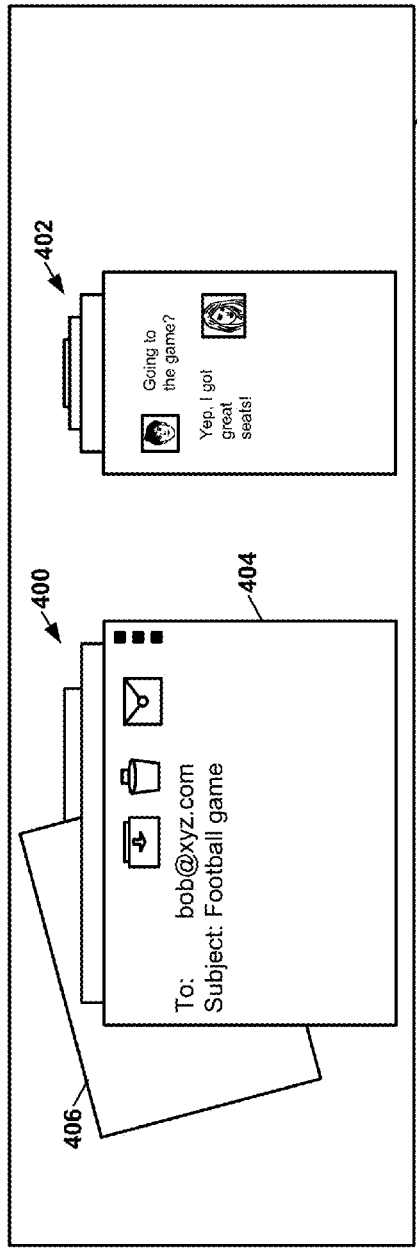
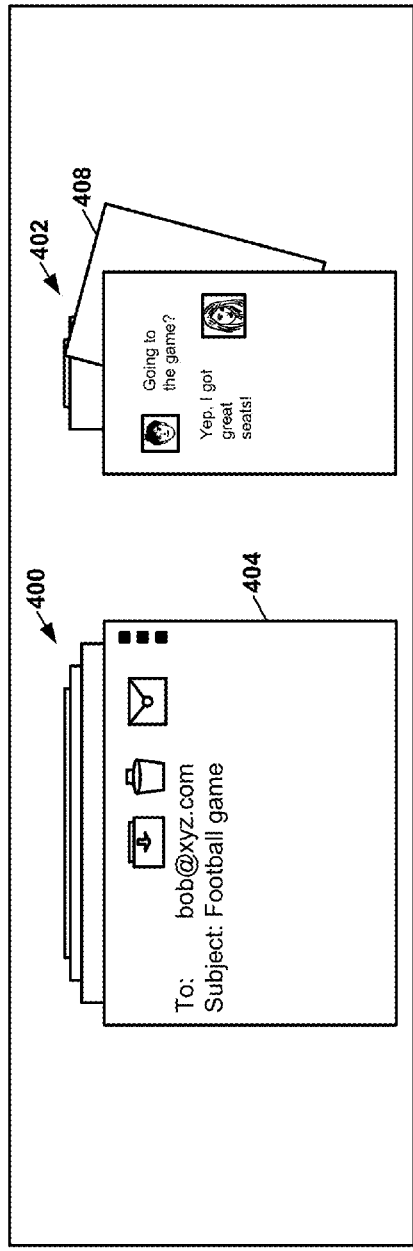
FIG. 13A
FIG. 13B

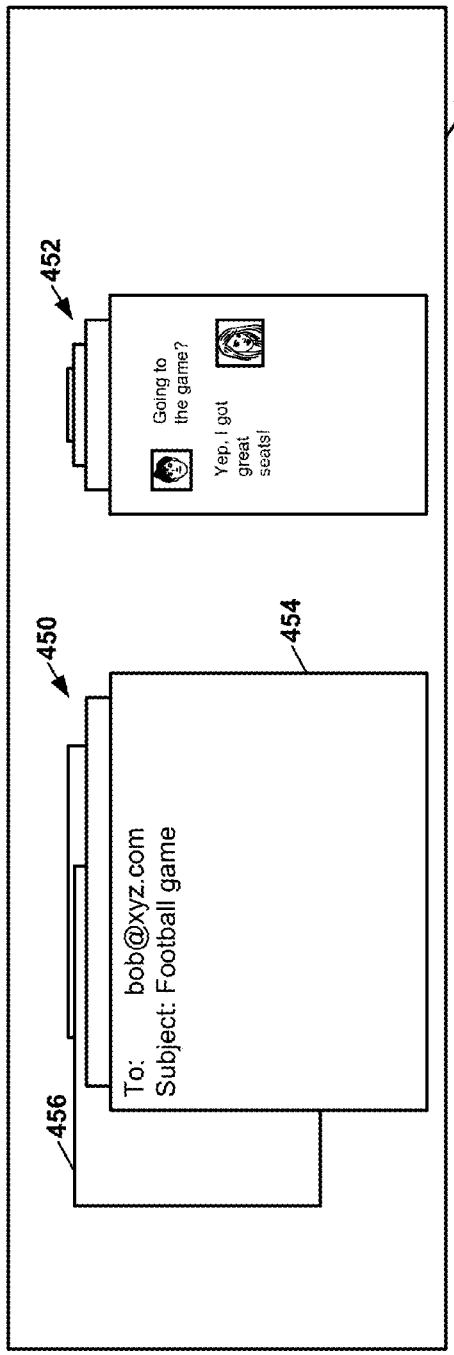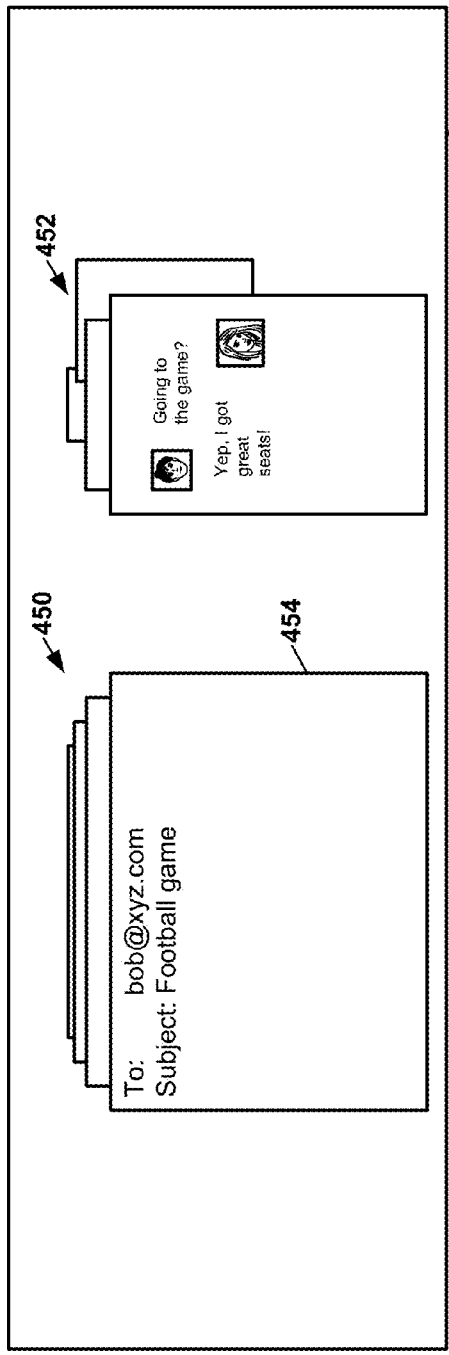

INDICATING RELATIONSHIPS BETWEEN WINDOWS ON A COMPUTING DEVICE

This application claims the benefit of U.S. Provisional Patent Application No. 61/930,341, filed Jan. 22, 2014, the entire content of which is incorporated herein by reference.

BACKGROUND

A computing device may output a plurality of graphical windows (i.e., windows) for display. For instance, many modern operating systems have user interfaces are capable of displaying multiple windows in a single graphical user interface region. The positioning of multiple windows may be based on absolute x, y coordinate values of each window within the single graphical user interface (GUI) region. The windows may include different content. For example, one window may include a draft email message and another window may include a spreadsheet.

In some instances, not all open windows are displayed at once. For example, the computing device may temporarily hide some windows from view while keeping the windows available for use. Hiding some windows from view may allow the user to use the available area of a display device efficiently. For example, when a user is multi-tasking, the user may wish to temporarily hide windows associated with a first task while working on a second task, and then un-hide the windows associated with the first task when working on the first task again.

In order to enable hiding and un-hiding of windows, the computing device may provide a GUI that enables the user to select which hidden windows to un-hide. In other words, the computing device may output, for display, a window selection GUI. The window selection GUI may include representations of windows. The organization of the representations of the windows in the window selection GUI may be arbitrary and/or agnostic to content and context. Responsive to receiving an indication of input to the window selection GUI, the computing device may output, for display, a previously hidden window. However, when there are many open windows, it may be difficult for the user to indicate to the computing device which window to un-hide.

SUMMARY

In one example, this disclosure describes a method comprising: outputting, by a computing device, for display, an arrangement of a set of windows organized into one or more visual stacks, wherein each respective visual stack from the one or more visual stacks comprises a respective subset of the set of windows sequenced based on a characteristic; determining, by the computing device, that a first window from the set of windows has a particular relationship with a second window from the set of windows, wherein the particular relationship is not based on the characteristic; and outputting, by the computing device, responsive to the determining, and for display, a visual indication of the first window, wherein the visual indication of the first window visually differentiates the first window from windows from the set of windows not having the particular relationship with the second window.

In another example, this disclosure describes a computing device comprising one or more processors configured to: output, for display, an arrangement of a set of windows organized into one or more visual stacks, wherein each respective visual stack from the one or more visual stacks comprises a respective subset of the set of windows sequenced based on a characteristic; determine that a first window from the set of windows has a particular relationship with a second window from the set of windows, wherein the particular relationship is not based on the characteristic; and responsive to the determining, output, for display, the visual indication of the first window and a visual indication of the second window, wherein the visual indication of the first window and the visual indication of the second window visually differentiate the first window and the second window from windows from the set of windows not having the particular relationship with the first window and the second window.

In another example, this disclosure describes a non-transitory computer-readable data storage medium having instructions stored thereon that, when executed by one or more processors of a computing device, cause the computing device to: output, for display, an arrangement of a set of windows organized into one or more visual stacks, wherein each respective visual stack from the one or more visual stacks comprises a respective subset of the set of windows sequenced based on a recentness of use of the set of windows; determine that a first window from the set of windows has a particular relationship with a second window from the set of windows, wherein any two windows in the set of windows have the particular relationship if the computing device opened one of the two windows in response to an indication of user input directed to another one of the two windows; and responsive to the determining, output, for display, the visual indication of the first window and a visual indication of the second window, wherein the visual indication of the first window and the visual indication of the second window visually differentiate the first window and the second window from windows from the set of windows not having the particular relationship with the first window and the second window.

One or more examples are set forth in the accompanying drawings and the description below. Other features, objects, and advantages will be apparent from the description, drawings, and claims.

BRIEF DESCRIPTION OF DRAWINGS

FIG. 12A is a conceptual diagram illustrating an example configuration of the window selection GUI, in accordance with an example of this disclosure.

FIG. 12B is a conceptual diagram illustrating an example configuration of the window selection GUI, in accordance with an example of this disclosure.

FIG. 13A is a conceptual diagram illustrating an example configuration of the window selection GUI, in accordance with an example of this disclosure.

FIG. 13B is a conceptual diagram illustrating an example configuration of the window selection GUI, in accordance with an example of this disclosure.

FIG. 14A is a conceptual diagram illustrating an example configuration of the window selection GUI, in accordance with an example of this disclosure.

FIG. 14B is a conceptual diagram illustrating an example configuration of the window selection GUI, in accordance with an example of this disclosure.

DETAILED DESCRIPTION

In some implementations, a computing device may define a plurality of graphical windows. For ease of explanation, this disclosure may refer to such graphical windows simply as "windows." Each of the windows may contain graphical content output by one or more applications. For example, one window may contain graphical content generated by a web browser application and another window may contain graphical content generated by a spreadsheet application.

As described herein, the computing device may output, for display, a window selection graphical user interface (GUI) that enables a user to select one or more windows from the set of windows. When the user has selected one or more windows, the computing device may output, for display, a window utilization GUI in place of the window selection GUI. The window utilization GUI may include the selected windows. In some implementations, when the windows are included in the window utilization GUI, the features contained in the windows are available for use by the user.

In accordance with some examples of this disclosure, the window selection GUI comprises an arrangement of the windows organized into one or more visual stacks. For ease of explanation, this disclosure may refer to such visual stacks of windows as simply "stacks." In some implementations, each respective stack comprises a respective subset of the set of windows, and the windows within the subset are sequenced based on a characteristic. For example, a window may be positioned within a stack based on how recently the window was included in the window utilization GUI or otherwise displayed for use by the user. Furthermore, in accordance with some examples of this disclosure, the computing device may determine that particular windows in the set of windows have a particular relationship with one another. For example, the computing device may determine that a first window was opened from a second window.

The computing device may output, responsive to such a determination, visual indications of windows that have the particular relationship with one another. For example, the computing device may output, responsive to a determination that a first window has the particular relationship with the second window, visual indications of the first and second windows that visually differentiate the first and second windows from windows from the set of windows not having the particular relationship with the first and second windows. In this way, the user may be able to identify easily windows in the stacks that have the particular relationship, which may make it easier for the user to select one or more windows from the set of windows to be included in the window utilization GUI. Thus, in the absence of such visual indicators, it may be difficult for users to quickly and easily organize and display windows, particularly if the user's workflow is non-linear.

Figure 1:
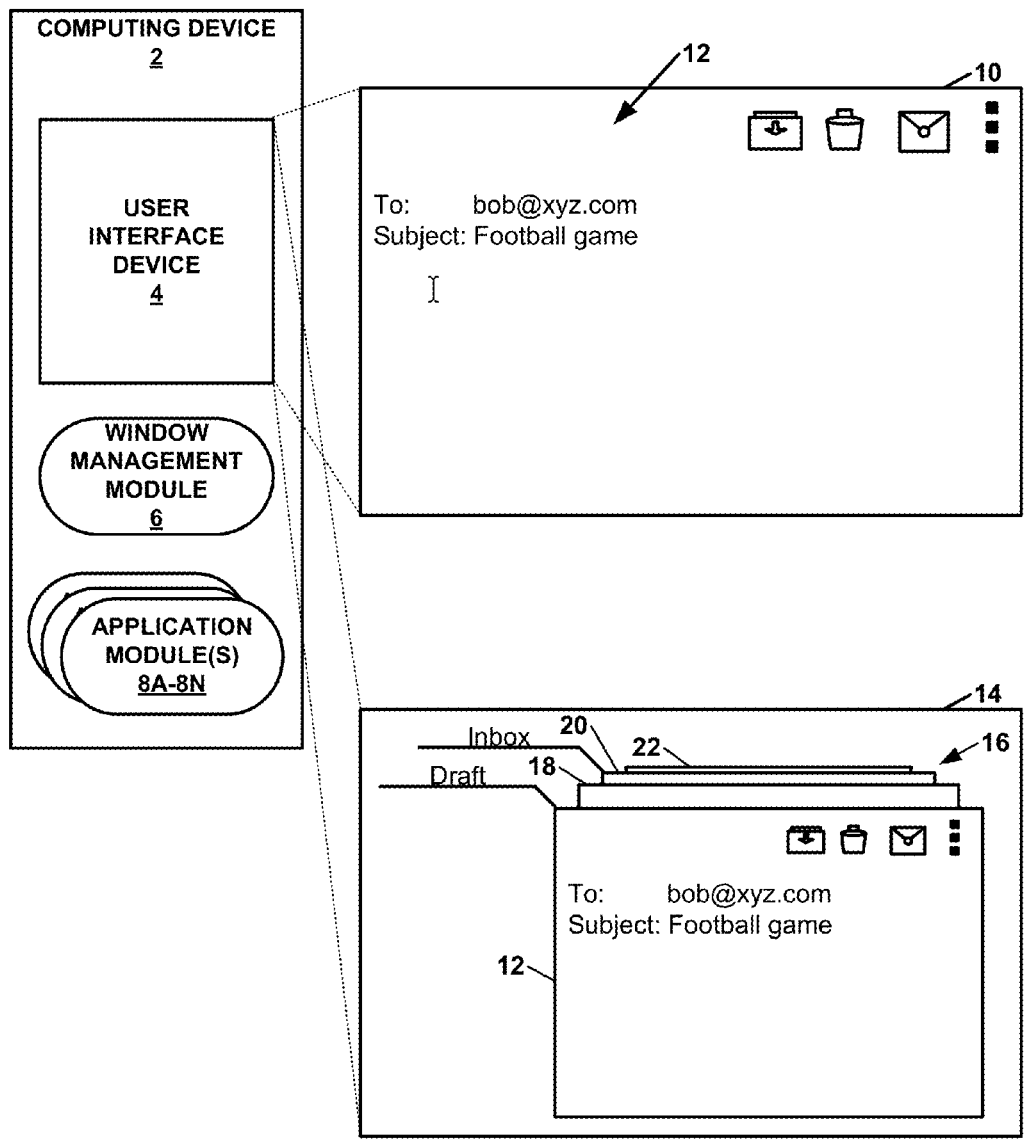
FIG. 1 is a conceptual diagram illustrating an example computing device, in accordance with one or more examples of the present disclosure.

FIG. 1 is a conceptual diagram illustrating an example computing device 2 in accordance with one or more examples of this disclosure. Computing device 2 may be various types of computing devices. For example, computing device 2 may be a mobile device, such as a mobile telephone, a tablet computer, a notebook or laptop computer, a personal media player, a portable gaming device, or another type of computing device designed for mobility. In other examples, computing device 2 may be other types of computing devices, such as desktop computers, point of sale devices, televisions, gambling devices, appliances, in-car computers, and other types of devices. Furthermore, in some examples, the term "computing device" may refer to a set of one or more integrated circuits, such as microprocessors, chipsets, and so on.

In the example of FIG. 1, computing device 2 includes at least one user interface (UI) device 4. UI device 4 may comprise a display device that displays graphical data and may also comprise a presence-sensitive input device that detects the presence of one or more input objects, such as fingers or styli. Because UI device 4 may display graphical data and may detect the presence of one or more input objects, UI device 4 may be referred to as a presence-sensitive display device. UI device 4 may be implemented using various technologies. For example, UI device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, UI device 4 may be able to detect the presence of an input object without the input object physically touching UI device 4. For example, in some such examples, UI device 4 may be able to detect the presence of the input object when the input object is within a particular space. In examples where UI device 4 comprises a presence-sensitive input device, UI device 4 may provide indications of user input to computing device 2. The indications of user input may indicate the presence and/or movement of input objects.

UI device 4 may be operatively coupled to computing device 2 in various ways. For example, UI device 4 may be integrated into a housing of computing device 2 and may be connected to computing device 2 via one or more internal connectors. In another example, UI device 4 may be external to a housing of computing device 2 and may communicate with computing device 2 via one or more external cables and/or communication networks.

Although the example of FIG. 1 assumes that UI device 4 is a presence-sensitive display device, the techniques of this disclosure are not so limited. In other examples, UI device 4 may be a display device that does not detect the presence of input objects. In some such examples, another device (e.g., one or more cameras, motion sensors, and/or other types of sensors) may detect the presence of input objects. In some examples, computing device 2 may receive indications of user input from other devices, such as physical keyboards and mice.

As shown in the example of FIG. 1, computing device 2 comprises a window management module 6. Furthermore, in the example of FIG. 1, computing device 2 comprises one or more application modules 8A-8N (collectively, "application modules 8"). Window management module 6 and application modules 8 may each comprise executable instructions that, when executed by one or more processors (e.g., microprocessors) of computing device 2, cause computing device 2 to perform particular functions. In other examples, window management module 6 and/or application modules 8 may be implemented at least partially in hardware.

As described in this disclosure, window management module 6 may provide window management functionality to computing device 2. Application modules 8 may cause computing device 2 to provide applications, such as web browser applications, office productivity applications, games, operating system applications, social media applications, and so on. Application modules 8 may use the window management functionality of window management module 6 to output graphical content in windows.

In the example of FIG. 1, window management module 6 outputs a window utilization graphical user interface (GUI) 10 for display at UI device 4. In general, a GUI may be a type of user interface that allows a user to use images to interact with a computing device. Window utilization GUI 10 includes one or more windows. Each of the one or more windows may contain graphical content for an application, document, game, operating system application, etc. When window management module 6 outputs window utilization GUI 10 for display and window utilization GUI 10 includes a particular window, the user may use interact with features displayed within the window.

For instance, in the example of FIG. 1, window utilization GUI 10 includes a window 12. Window 12 is a window for composing an email message. Thus, when window management module 6 outputs window utilization GUI 10 for display and window utilization GUI 10 includes window 12, computing device 2 may receive indications of user input to compose an email message and may output, for display within window 12, data based on the user input (e.g., text of the email message). In other examples, window utilization GUI 10 may include windows associated with other tasks or applications, such as word processors, spreadsheets, web browsers, games, and so on.

In some examples, the one or more windows included in window utilization GUI 10 may occupy all or the substantially all of the usable area of window utilization GUI 10. For example, the one or more windows included in window utilization GUI 10 may occupy all of the usable area of window utilization GUI 10 except for particular borders (e.g., so-called "chrome" around the one or more windows) and/or onscreen controls (e.g., buttons, status bars, etc.). Furthermore, in some such examples, window utilization GUI 10 may occupy all or substantially all of the usable area of a display screen (e.g., a display screen of user interface device 4). Thus, in such examples, window management module 6 may output a particular window for display in a so-called "full screen" mode because the particular window occupies all or substantially all of the window utilization GUI 10 and window utilization GUI occupies all or substantially of the usable area of the display screen. Furthermore, window management module 6 may output two particular windows for display within window utilization GUI 10 in a so-called "split screen" mode because all or substantially all of the usable area of window utilization GUI 10 is split between the two particular windows and window utilization GUI 10 occupies all or substantially of the usable area of the display screen.

A user of computing device 2 may wish to change which window or windows are included in window utilization GUI 10. Accordingly, computing device 2 is configured to receive an indication of a user input to display a window selection GUI 14. Responsive to the indication of the user input, window management module 6 may output window selection GUI 14 for display in place of window utilization GUI 10.

In different examples, window management module 6 may output window selection GUI 14 in response to indications of different types of user input. For example, window management module 6 may output window selection GUI 14 in place of window utilization GUI 10 in response to receiving an indication that a user has depressed a particular physical button or key. In another example, window management module 6 may output window selection GUI 14 in place of window utilization GUI 10 in response to receiving an indication that a user has touched or otherwise selected an onscreen control (e.g., an onscreen button, slider, or another type of onscreen feature for user interaction). In another example, computing device 2 may receive an indication, from one or more sensors, that the user has performed a "pushing" gesture. The user may perform the "pushing" gesture by moving, while the fingers of the user's hand are spread, the user's hand within a space in front, from the user's perspective, of an area where the user perceives window utilization GUI 10 to be displayed, toward the area where the user perceives window utilization GUI 10 to be displayed. For instance, if a display screen displays window utilization GUI 10, the user may perform the "pushing" gesture by spreading the fingers of the user's hand and moving the user's hand toward the display screen. Thus, performing the "pushing" gesture may be cognitively analogous to the act of pushing, in a 3-dimensional fashion, windows included in window utilization GUI 10 deeper into the display screen.

Window management module 6 may concurrently maintain a plurality of so-called "open" windows in addition to the windows included in window utilization GUI 10. In this disclosure, window management module 6 may maintain, in memory or another type of storage media, state data for each of the "open" window. The state data for a window may include data that indicate content of the window (i.e., the content to be displayed in the window when the window is included in window utilization GUI 10). The state data for a window may also include data indicating states of one or more processes and/or threads that control the content of the window. In some examples, processes and/or threads of a single application may control the content of multiple windows.

Window selection GUI 14 may enable a user of computing device 2 to select one or more of the "open" windows to be the windows included in window utilization GUI 10. In other words, window selection GUI 14 may enable the user to select one or more "hidden" windows to be the windows shown and available for use by the user. In accordance with some examples of this disclosure, window selection GUI 14 may include an arrangement of the "open" windows organized into one or more stacks. Each respective stack from the one or more stacks comprises a respective subset of the "open" windows. In some examples where window selection GUI 14 only includes a single stack, the stack may include each of the "open" windows. Opening a window may involve computing device 2 (e.g., window management module 6 of computing device 2) starting to maintain state data for the window.

In some examples, each of the stacks may be cognitively analogous to a 3-dimensional stack of cards, where each of the cards is a different "open" window. Thus, windows that are lower in the stack are at least partially obscured by windows that are higher in the stack.

In the example of FIG. 1, window selection GUI 14 includes a stack 16. As shown in FIG. 1, stack 16 includes windows 12, 18, 20, and 22. Window 12 partially obscures the additional windows in stack 16.

Window management module 6 may sequence the windows of a stack based on a characteristic. For example, window management module 6 may sequence, within a stack, each window of the stack based on how recently the window was included in window utilization GUI 10. Thus, in this example, windows that were recently included in window utilization GUI 10 may be higher in the stack than windows that have not been recently included in window utilization GUI 10. In another example, each window of a stack may be sequenced in the stack based on frequency with which the window has been included in window utilization GUI 10. Thus, in this example, windows frequently included in window utilization GUI 10 may be higher in the stack than windows that are infrequently included in window utilization GUI 10, even if one of the infrequently included windows was included in window utilization GUI 10 more recently than one of the frequently included windows.

For each respective stack in the one or more stacks in window selection GUI 14, there is a "head" window for the respective stack and a "tail" window for the respective stack. The head window of a stack and the tail window of the stack are windows at opposite ends of the stack. In some examples, the head window of a stack may be a most prominently displayed window of the stack. For example, the head window of a stack may be a window of the stack that is not obscured by any other window of the stack. In the example of FIG. 1, window 12 is the head window of stack 16 because window 12 is not obscured by any other window of stack 16. In some examples, higher windows in the stack may completely obscure the tail window of the stack.

For any two windows a and b in a stack, if a is closer sequentially to the head window of the stack than b, a is "higher" in the stack than b. Likewise, for any two windows a and b in a stack, if a is closer sequentially to the tail window of the stack than b, a is "lower" in the stack than b. Thus, the head window of a stack is the highest window in the stack and the tail window of the stack is the lowest window in the stack. Despite the terminology of "higher" and "lower," it shall be appreciated that in some example configurations of window selection GUI 14 (such as the example configuration shown in the example of FIG. 1), windows that are lower in a stack may be displayed at locations above windows that are higher in the stack. In other examples, windows that are lower in a stack may be displayed at other locations (e.g., below, left, right, etc.) relative to windows that are higher in the stack.

Window management module 6 may output window utilization GUI 10 for display in place of window selection GUI 14. In some examples, window management module 6 may output window utilization GUI 10 in place of window selection GUI 14 responsive to receiving an indication of a particular user input. When window management module 6 outputs window utilization GUI 10 for display in place of window selection GUI 14, window utilization GUI 10 may include the head window of a stack displayed in window selection GUI 14, but not other windows in the stack. Thus, in the example of FIG. 1, if window 12 is the head window of stack 16 when window management module 6 outputs window utilization GUI 10 for display in place of window selection GUI 14, window utilization GUI 10 includes window 12, but not the additional windows in stack 16.

Responsive to one or more indications of user input, window management module 6 may update, in window selection GUI 14, which window of a stack is the head window of the stack. Thus, by providing user input to change which window is the head window of the stack, the user may select which window of the stack is to be included in window utilization GUI 10 when window management module 6 outputs window utilization GUI 10 for display in place of window selection GUI 14.

For example, a first window may be a head window of a stack in window selection GUI 14. In this example, if the first window is the head window of the stack when window management module 6 outputs window utilization GUI 10 for display in place of window selection GUI 14, window utilization GUI 10 includes the first window, but not other windows of the stack. In this example, responsive to one or more indications of user input, window management module 6 may output window selection GUI 14 for display such that a second window is the head window of the stack instead of the first window. Thus, in this example, if the second window is the head of the stack when window management module 6 outputs window utilization GUI 10 for display in place of window selection GUI 14, window utilization GUI 10 includes the second window and not the first window.

In different examples, window management module 6 may update, responsive to indications of different types of user input, which window of a stack is the head window of the stack. For example, window management module 6 may update which window of a stack is the head window of the stack in response to receiving an indication of a swipe gesture. For instance, in the example of FIG. 1, window management module 6 may, responsive to receiving an indication of a downward swipe gesture, visually send window 12 to a lowest position in stack 16 and the next-highest window (i.e., window 18) in stack 16 becomes the head window of stack 16. Conversely, in the example of FIG. 1, window management module 6 may, responsive to receiving an indication of an upward swipe gesture, make the tail window (i.e., window 22) in stack 16 the head window of stack 16 and may visually push the previous head window of stack 16 (i.e., window 12) to a next-lower position in stack 16. Thus, in this example, the upward and downward swipe gestures may be cognitively analogous to flipping backward and forward through cards in a circular rolodex. A swipe gesture is a gesture in which a user moves an input object, such as a finger or stylus, in a swiping motion. In other examples, window management module 6 may update which window of a stack is the head window of the stack in response to receiving an indication that a user has depressed a physical button, selected or otherwise interacted with an onscreen control, or otherwise provided a particular user input.

There may be particular relationships between particular windows shown in the one or more stacks of window selection GUI 14. These relationships may be different from the characteristic upon which window management module 6 sequences the windows in the one or more stacks. For example, a first window may be related to a second window by virtue of window management module 6 opening the first window in response to an indication of user input received via (e.g., directed to) the second window. In other words, two windows may have the particular relationship if computing device 2 opened one of the two windows in response to an indication of user input directed to another one of the two windows. Thus, in this example, window management module 6 may maintain parent-child relationships between visually-displayable windows (presented in window selection GUI 14 as "cards") in order to later recall a related group of windows.

In the example of FIG. 1, window 12 includes a draft of an email message and window 20 includes an email inbox. In this example, window management module 6 may have opened window 12 in response to receiving an indication of user input to select an onscreen control in window 20. Hence, in this example, window 12 and window 20 may have a particular relationship.

In another example, a first window may be related to a second window by virtue of the first and second window being updated by the same application. For instance, the first and second windows may contain views of different webpages but both the first and second windows may be updated the same web browser application. In another example, a first window and a second window may have a particular relationship by virtue of the first and second windows including similar content. In other words, two windows have the particular relationship if the two windows contain related subject matter. In another example, a first window may have a particular relationship with a second window if the first and second windows are of the same application type (e.g., the first and second windows are web browser windows, office productivity windows, etc.).

In another example, windows that relate to the same user context may have the particular relationship. For instance, if a first user of computing device 2 is using computing device 2 to communicate with a second user, window management module 6 may maintain one or more relationships between windows that each include communications or content from the second user (e.g., email, instance message, etc.). In another example, the particular relationship may be based on geographic location information. For instance, in this example, window management module 6 may determine that a maps application window has a particular relationship with a web browser window when the web browser window contains information that relates to a location displayed or searched for in the maps application window. In other examples, window management module 6 may establish relationships based on social networking information, time, and so on. In still other examples, responsive to receiving an indication of user input to drag and drop content from one window to another window, window management module 6 may create a relationship based on copying and pasting content from one relationship to another. In another example, window management module 6 may determine that two windows are related in response to receiving an indication of user input that explicitly indicates that the two windows are related. In other examples, windows may be related according to other relationships.

Users may want to switch frequently between related windows. However, the locations within a stack of related windows may not be readily apparent. For instance, in the example of FIG. 1, the user may want to refer back to the user's inbox when composing a draft email in window 12 (e.g., to look for previous email messages from a person to whom the draft is addressed). Hence, in this example, the user may want window 20 to be included in window utilization GUI 10 in place of window 12. However, since higher windows in stack 16 (e.g., window 12, window 18, etc.) at least partially obscure lower windows in stack 16 and window 20 may be buried deeply in stack 16, the location within stack 16 of window 20 may not be readily apparent. As a result, the user may have to provide multiple user inputs to scan through the windows of stack 16 one at a time until window 20 is the head window of stack 16.

Hence, in accordance with one or more examples of this disclosure, window management module 6 may output, responsive to determining that a first window and a second window have a particular relationship, a visual indication of the first window that visually differentiates the first window from windows from the set of windows not having the particular relationship with the second window. For instance, in the example of FIG. 1, window management module 6 may determine that windows 12 and 20 are related. In this example, window management module 6 output, for display, labels 24 and 26 that identify windows 12 and 20. Windows 18 and 22 do not have the particular relationship. Hence, in the example of FIG. 1, window management module 6 does not output labels for windows 18 and 22. In other examples, window management module 6 may output different types of visual indications that visually differentiate windows related by the particular relationship from windows not related by the particular relationship.

Thus, in accordance with one or more examples of this disclosure, computing device 2 may output an arrangement of a set of windows organized into one or more stacks, wherein each respective stack from the one or more stacks comprises a respective subset of the set of windows sequenced based on a characteristic. Furthermore, computing device 2 may determine that a first window from the set of windows has a particular relationship with a second window from the set of windows, wherein the particular relationship is not based on the characteristic. In addition, computing device 2 may output, responsive to the determining, for display, a visual indication of the first window, wherein the visual indication of the first window visually differentiates the first window from windows from the set of windows not having the particular relationship with the second window.

Figure 2:
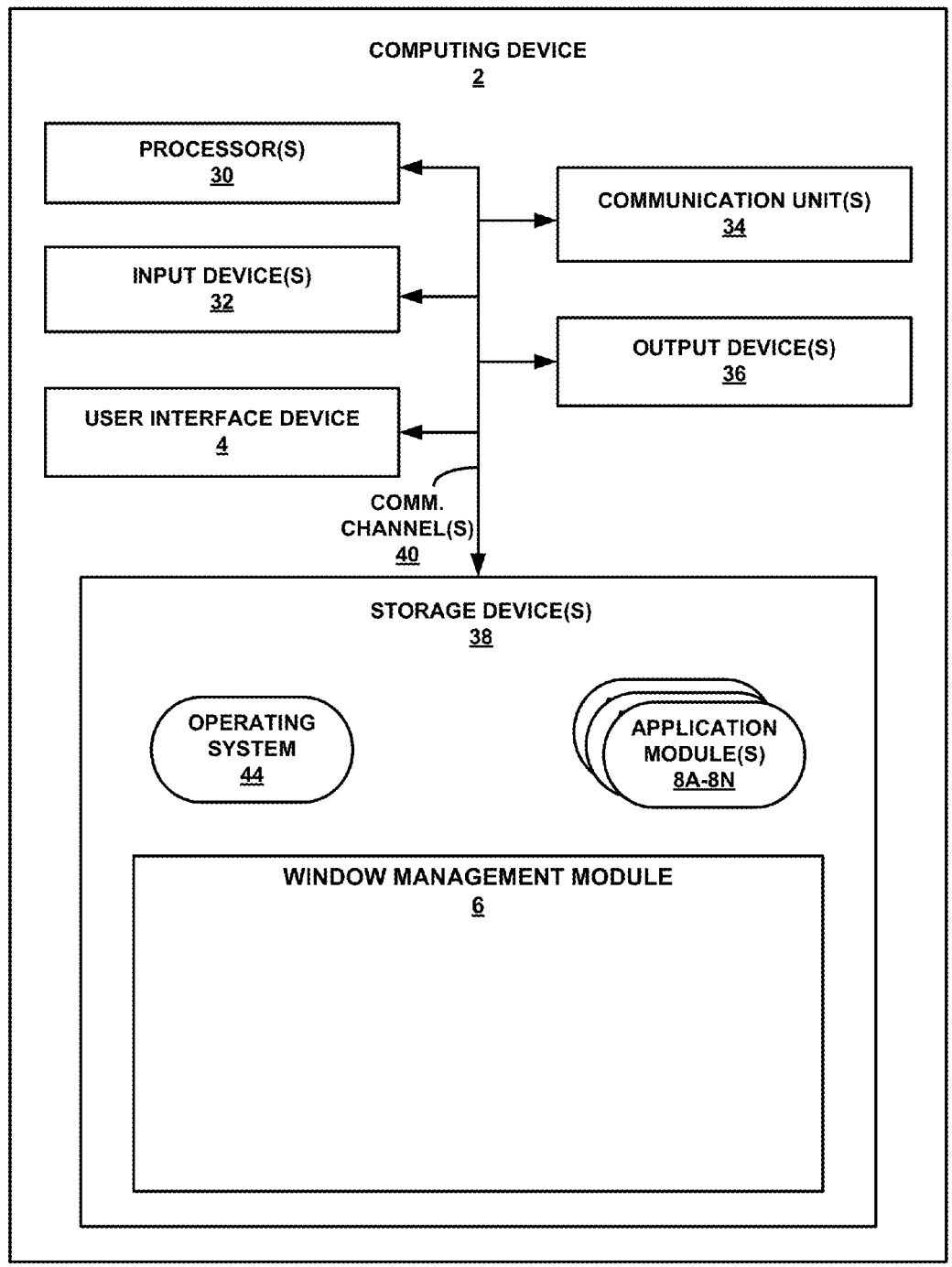
FIG. 2 is a block diagram illustrating an example computing device, in accordance with one or more examples of the present disclosure.

FIG. 2 is a block diagram illustrating an example configuration of computing device 2, in accordance with one or more examples of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and UI device 4. Computing device 2 may include many other components. For example, computing device 2 may include physical buttons, microphones, speakers, communication ports, and so on.

Communication channel(s) 40 may interconnect each of the components 30, 32, 34, 36, 38, and 4 for inter-component communications (physically, communicatively, and/or operatively). In some examples, communication channel(s) 40 may include a system bus, a network connection, an inter-process communication data structure, or any other method for communicating data.

Storage device(s) 38 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 on computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network. Examples of communication unit(s) 34 may include network interface cards, Ethernet cards, optical transceivers, radio frequency transceivers, or other types of devices that are able to send and receive information. Other examples of such communication units may include Bluetooth, 3G, and WiFi radios, Universal Serial Bus (USB) interfaces, etc.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processor(s) 30 may configure or cause computing device 2 to provide at least some of the functionality ascribed in this disclosure to computing device 2. As shown in the example of FIG. 2, storage device(s) 38 include computer-readable instructions associated with operating system 44, window management module 6, and application modules 8A-8N. Although shown as separate from operating system 44, window management module 6 may, in some examples, be part of operating system 44.

Execution of instructions associated with operating system 44 may cause computing device 2 to perform various functions to manage hardware resources of computing device 2 and to provide various common services for other computer programs. Execution of instructions associated with window management module 6 may cause computing device 2 to provide window management functionality, in accordance with examples of this disclosure. For ease of explanation, this disclosure may describe window management module 6 as performing particular actions as a concise way of indicating that execution of instructions associated with window management module 6 by processors 30 causes computing device 2 to perform the particular actions. Execution of instructions associated with application modules 8 may cause computing device 2 to provide various applications (e.g., "apps").

In some examples, window management module 6 may provide an application programming interface (API) that includes methods. Operating system 44 and application modules 8 may invoke particular methods of the API provided by window management module 6 in order to open windows. In other words, window management module 6 may receive requests from operating system 44 and/or application modules 8 to open windows. When window management module 6 receives a request to open a window, window management module 6 may generate window state data for the window. The window state data for a window may include various types of information about the window, such as an identifier of the window, information indicating recentness of use, window size information, data indicating processes registered to receive events related to the window, and so on. In addition, when window management module 6 receives a request to open a window, window management module 6 may receive and/or generate relationship data for the window. The relationship data for a window may indicate how the window is related to other open windows.

In addition, when window management module 6 receives a request to open a window, window management module 6 may generate a list of processes (e.g., heavyweight processes, threads, etc.) that subscribe to events associated with the window. For instance, a process that requested window management module 6 to open a window may receive, from window management module 6 events indicating user input directed to features (e.g., buttons, links, text areas, or the items for user interaction) of the window.

Window management module 6 may output window utilization GUI 10 for display. Window utilization GUI 10 may include one or more of the open windows. Window management module 6 may receive indications of user input directed to features (e.g., buttons, text boxes, links, etc.) of windows included in window utilization GUI 10. In response to some such indications of user input, window management module 6 may provide events to processes (e.g., heavyweight processes, threads, etc.) that subscribe to events associated with the windows. Application modules 8 and/or operating system 44 may cause computing device 2 to execute such processes. Window management module 6 may maintain a list of processes that subscribe to events associated with the windows. An event may provide information about a user input directed to a feature of a window.

When a process receives an event that provides information about a user input directed to a feature of a window included in window utilization GUI 10, the process may process the event and may invoke methods of the API of window management module 6 to update content of the window. For example, responsive to receiving an indication of a tapping gesture at a region of a display screen associated with a particular key of a graphical keyboard, window management module 6 may provide an event to a process associated with a window. In this example, the process may, responsive to the event, invoke a method of the API of window management module 6 to display, within the window, a character associated with the particular key. Furthermore, processes can use methods of the API of window management module 6 to update the contents of windows without first receiving events indicating user input.

Furthermore, window management module 6 may determine an arrangement of a plurality of windows into one or more stacks of windows (i.e., stacks). For each respective stack of windows in the one or more stacks of windows, windows are sequenced within the respective stack of windows based on a first relationship. In other words, each window is sequenced based on a characteristic. Furthermore, window management module 6 may determine that one or more windows in the plurality of windows have a second relationship with a window of interest in the plurality of windows (e.g., a head window of a primary stack from the one or more stacks of windows). The second relationship may be different than the first relationship. For example, the first relationship may be that, for each given window in a stack, if the given window was used more recently than another window in the stack, the given window is higher in the stack than the other window. Furthermore, in this example, two windows may have the second relationship if window management module 6 opened one of the windows in response to a request from a process that manages the other one of the windows.

Furthermore, window management module 6 may generate a window selection GUI (e.g., window selection GUI 14) that includes the one or more stacks of windows. Window management module 6 may generate the window selection GUI such that the window selection GUI includes one or more visual indicators that identify the one or more windows determined to have the second relationship with the window of interest. For example, the window selection GUI may include labels that identify the one or more windows determined to have the second relationship with the window of interest. In another example, the one or more visual indicators visually indicate the one or more windows that have the second relationship with the window of interest by virtue of the one or more windows that have the second relationship with the window of interest being tilted relative to each window in the one or more stacks of windows that do not have the second relationship with the window of interest. In another example, the one more visual indicators visually indicate the one or more windows that have the second relationship with the window of interest by virtue of the one or more windows that have the second relationship with the window of interest being displaced within the one or more stacks of windows relative to each window in the one or more stacks of windows that do not have the second relationship with the window of interest.

In one example where window management module 6 maintains parent-child relationships between windows, window management module 6 may output, for display, a first window in window utilization GUI 10. In this example, the first window may be a user interface of a web browser application. The first window may display a webpage that includes a hyperlink to a cloud-based spreadsheet. In this example, window management module 6 may receive an indication of a user input to select the hyperlink. Responsive to the indication of the user input, window management module 6 may generate a new window (i.e., a second window) corresponding to an office productivity application that includes the content of the cloud-based spreadsheet. When window management module 6 generates the second window, window management module 6 may maintain a parent-child relationship between the first window (i.e., the user interface of the web browser application) and the second window (i.e., the user interface of the office productivity application). Accordingly, when window management module 6 outputs window selection GUI 14 for display and the first window is the head window of a stack, window management module 6 may include, in window selection GUI 14, a visual indicator to indicate that the second window is a child window of the first window. Similarly, when window management module 6 outputs window selection GUI 14 for display and the second window is the head window of a stack, window management module 6 may include, in window selection GUI 14, a visual indicator to indicate that the first window is a parent window of the second window. Because the user's thought process and workflow with windows may be non-linear and windows in the stack may be sequenced based on recentness of use, the first window may be separated from the second window. Thus, there may be one or more windows in the stack between the first window and the second window. Hence, the visual indicator that indicates that the first window is the parent window of the second window may be especially useful.

As indicated above, window selection GUI 14 may include one or more stacks. In some examples, one of the one or more stacks is a primary stack. For instance, where window selection GUI 14 includes multiple stacks, one of the stacks is a primary stack and the other stacks are secondary stacks. In instances where window selection GUI 14 only includes a single stack, the single stack is the primary stack and there are no secondary stacks. In such examples, window management module 6 outputs visual indicators to visually distinguish windows having the particular relationship with the head window of the primary stack from windows not having the particular relationship with the head window of the primary stack. In such examples, window management module 6 does not output visual indicators to visually differentiate windows having the particular relationship (or other relationships) with a window other than the head window of the primary stack from windows not having the particular relationship (or other relationships) with a window other than the head window of the primary stack (including the head window of a secondary stack).

Thus, in some of the examples described above, window management module 6 may set a first window as a head window of a particular visual stack from the one or more visual stacks (e.g., the primary visual stack). Furthermore, responsive to setting the first window as the head window of the particular visual stack, window management module 6 may determine whether a second window has a particular relationship with the first window. Responsive to determining that the second window has the particular relationship with the first window, window management module 6 may output, for display, a visual indication of the second window. The visual indication of the second window may visually differentiate the second window from windows from the set of windows not having the particular relationship with the first window.

In other examples, window management module 6 may determine whether windows are related to windows that are not the head window of a stack. In some such examples, window management module 6 may output, for display, a visual indication that a non-head window of a stack has a particular relationship with another non-head window of the stack or another stack.

Furthermore, in some examples where window selection GUI 14 includes multiple stacks, window management module 6 may separately determine windows related to the head windows of each of the stacks. For example, window selection GUI 14 may include a first stack and a second stack. In this example, window management module 6 may determine that a particular window in the first window has a first relationship with the head window of the first stack. In addition, window management module 6 may determine that a second window has a second relationship with the head window of the second stack. In this example, the first relationship may be the same or different than the second relationship. Furthermore, in this example, responsive to these determinations, window management module 6 may output, for display, a visual indication of the first window and a visual indication of the second window. The visual indication of the first window may visually differentiate the first window from windows in the first stack that do not have the first relationship with the head window of the first stack. The visual indication of the second window may visually differentiate the second window from windows in the second stack that do not have the second relationship with the head window of the second stack.

As described elsewhere in this disclosure, window management module 6 may update which window of a stack is the head window of the stack. In some examples, when different windows are the head window of a stack, window management module 6 may identify related windows based on different relationships. For example, if one window is the head window of a stack, window management module 6 may output a visual indicator that visually differentiates a parent or child window from other windows. In this example, if another window is the head window, window management module 6 may output a visual indicator that visually differentiates a window having similar content to the head window from other windows. Thus, in one example, a first window may be the head window of the stack and later a second, different window may be the head window of the stack. In this example, when the first window is the head window of the stack, window management module 6 may determine windows that have a first relationship to the first window. Furthermore, when the first window is the head window of the stack, window management module 6 may output, for display, visual indicators that visually differentiate the windows having the first relationship to the first window from windows not having the first relationship to the first window. Window management module 6 does not output visual indicators that visually differentiate the windows having the second relationship with the first window from windows not having the second relationship with the first window. However, when the second window is the head window of the stack, window management module 6 may output, for display, visual indicators that visually differentiate the windows having the second relationship with the second window from windows not having the second relationship with the second window. Furthermore, when the second window is the head window of the stack, window management module 6 does not output visual indicators that visually differentiate the windows having the first relationship with the second window from windows not having the first relationship with the second window.

Figure 3:
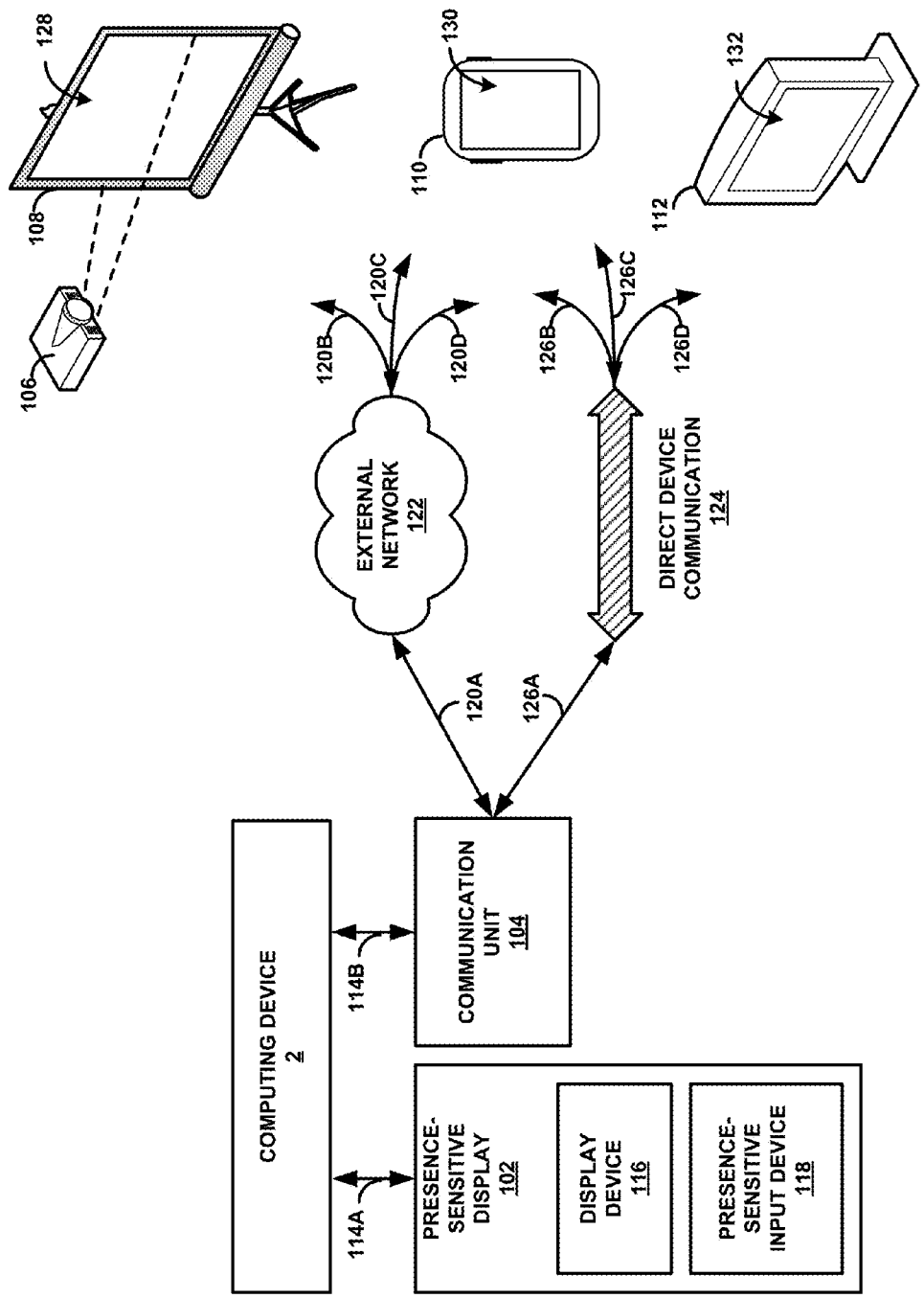
FIG. 3 is a block diagram illustrating an example in which a computing device outputs graphical content for display at one or more remote display devices, in accordance with one or more examples of the present disclosure.

FIG. 3 is a block diagram illustrating an example computing device 2 that outputs data for display by one or more remote devices, in accordance with one or more examples of the present disclosure. The one or more remote devices may display graphical content based on the data output by computing device 2. In general, graphical content may include any visual information that may be output for display, such as text, images, a group of moving images, etc. In some examples, computing device 2 may output data, such as Hypertext Markup Language (HTML) data, that a remote device may render to generate graphical content displayed by the remote device. In other examples, computing device 2 may output digital or analog signals that a remote device may use to generate graphical content displayed by the remote device.

In the example of FIG. 3, computing device 2 is operatively coupled to a presence-sensitive display 102 and a communication unit 104. Furthermore, in the example of FIG. 3, the one or more remote devices include a projector 106, a projection screen 108, a mobile device 110, and a visual display device 112. Computing device 2 may include and/or be operatively coupled to one or more other devices, e.g., input devices, output devices, memory, storage devices, etc. that are not shown in FIG. 3 for purposes of brevity and illustration.

Computing device 2 may be a processor that has the functionality described above with respect to processor(s) 30 (FIG. 2). For instance, computing device 2 may be a microprocessor, application specific integrated circuits (ASICs), or another type of integrated circuit configured to implement the techniques of this disclosure. In other examples, such as those illustrated in FIGS. 1 and 2, computing device 2 may be a stand-alone computing device that includes or is operatively coupled to a presence-sensitive display. In such examples, computing device 2 may be a desktop computer, a tablet computer, a smart television platform, a camera, a personal digital assistant (PDA), a server device, a mainframe computer, a telephone, a portable gaming device, a personal media player, a remote control device, a wearable computing device, or another type of computing device. In this disclosure, a first device may be said to be operatively coupled to a second device if the operations of the first and second devices are coupled in some way.

Computing device 2 may communicate with presence-sensitive display 102 via a communication channel 114A. Computing device 2 may communicate with communication unit 104 via a communication channel 114B. Communication channels 114A, 114B may each include a system bus or another suitable connection. Although the example of FIG. 3 shows computing device 2, presence-sensitive display 102, and communication unit 104 as being separate, computing device 2, presence-sensitive display 102, and/or communication unit 104 may be integrated into a single device.

In the example of FIG. 3, presence-sensitive display 102 includes a display device 116 and a presence-sensitive input device 118. Display device 116 may display graphical content based on data received from computing device 2. Presence-sensitive input device 118 may determine one or more user inputs (e.g., continuous gestures, multi-touch gestures, single-touch gestures, etc.). Presence-sensitive input device 118 may use capacitive, inductive, and/or optical recognition techniques to determine the user inputs. Presence-sensitive display 102 may send indications of such user inputs to computing device 2 via communication channel 114A or another communication channel. In some examples, presence-sensitive input device 118 is physically positioned relative to display device 116 such that presence-sensitive input device 118 is able to detect the presence of an input object (e.g., a finger or a stylus) at a location on display device 116 that displays a graphical element when a user positions the input object at the location on display device 116 that displays the graphical element.

Communication unit 104 may have the functionality of one or more of communication units 34. This disclosure describes the functionality of communication units 34 with regard to FIG. 2. Examples of communication unit 104 may include network interface cards, Ethernet cards, optical transceivers, radio frequency transceivers, Bluetooth, 3G, and WiFi radios, Universal Serial Bus (USB) interfaces, or other types of devices that are able to send and receive data. When computing device 2 outputs data for display by the one or more remote devices (such as projector 106, projection screen 108, mobile device 110, and visual display device 112), computing device 2 may output the data to a communication unit of computing device 2, such as communication unit 104. Communication unit 104 may send the data to one or more of the remote devices. The one or more remote devices may display graphical content based at least in part on the data.

Communication unit 104 may send and receive data using various communication techniques. In the example of FIG. 3, a network link 120A operatively couples communication unit 104 to an external network 122. Network links 120B, 120C, and 120D may operatively couple each of the remote devices to external network 122. External network 122 may include network hubs, network switches, network routers, or other types of devices that exchange information between computing device 2 and the remote devices illustrated in FIG. 3. In some examples, network links 120A-120D may be Ethernet, ATM or other wired and/or wireless network connections.

In some examples, communication unit 104 may use direct device communication 124 to communicate with one or more of the remote devices included in FIG. 3. Direct device communication 124 may include communications through which computing device 2 sends and receives data directly with a remote device, using wired or wireless communication. That is, in some examples of direct device communication 124, data sent by computing device 2 may not be forwarded by one or more additional devices before being received at the remote device, and vice-versa. Examples of direct device communication 124 may include Bluetooth, Near-Field Communication, Universal Serial Bus, WiFi, infrared, etc. One or more of the remote devices illustrated in FIG. 3 may be operatively coupled with communication unit 104 by communication links 126A-126D. In some examples, communication links 126A-126D may be connections using Bluetooth, Near-Field Communication, Universal Serial Bus, infrared, etc. Such connections may be wireless and/or wired connections.

In the example of FIG. 3, projector 106 receives data from computing device 2. Projector 106 may project graphical content based on the data onto projection screen 108. The example of FIG. 3 shows projector 106 as a tabletop projector and shows projection screen 108 as a freestanding screen. In other examples, computing device 2 may output data for display by other types of projection devices, such as electronic whiteboards, holographic display devices, and other suitable devices for displaying graphical content.

In some examples, projector 106 may determine one or more user inputs (e.g., continuous gestures, multi-touch gestures, single-touch gestures, etc.) at projection screen 108 and send indications of such user input to computing device 2. In such examples, projector 106 may use optical recognition or other suitable techniques to determine the user input. Projection screen 108 (e.g., an electronic whiteboard) may display graphical content based on data received from computing device 2.

Mobile device 110 and visual display device 112 may each have computing and connectivity capabilities and may each receive data that computing device 2 output for display. Examples of mobile device 110 may include e-reader devices, convertible notebook devices, hybrid slate devices, etc. Examples of visual display device 112 may include televisions, computer monitors, etc. As shown in FIG. 3, projection screen 108 may include a presence-sensitive display 128, mobile device 110 may include a presence-sensitive display 130, and visual display device 112 may include a presence-sensitive display 132. Presence-sensitive displays 128, 130, 132 may have some or all of the functionality described in this disclosure for UI device 4. In some examples, presence-sensitive displays 128, 130, 132 may include functionality in addition to the functionality of UI device 4. Presence-sensitive displays 128, 130, 132 may receive data from computing device 2 and may display graphical content based on the data. In some examples, presence-sensitive displays 128, 130, 132 may determine one or more user inputs (e.g., continuous gestures, multi-touch gestures, single-touch gestures, etc.) and send indications of such user input to computing device 2. Presence-sensitive displays 128, 130, and/or 132 may use capacitive, inductive, optical recognition techniques and/or other techniques to determine the user input.

In some examples, computing device 2 does not output data for display by presence-sensitive display 102. In other examples, computing device 2 may output data for display such that both presence-sensitive display 102 and the one or more remote devices display the same graphical content. In such examples, each respective device may display the same graphical content substantially contemporaneously. In such examples, the respective devices may display the graphical content at different times due to communication latency. In other examples, computing device 2 may output data for display such that presence-sensitive display 102 and the one or more remote devices display different graphical content.

In the example of FIG. 3, computing device 2 may output, for display by presence sensitive display 102 and/or the remote devices, an arrangement of a set of windows organized into one or more visual stacks. Each respective visual stack from the one or more visual stacks may comprise a respective subset of the set of windows sequenced based on a characteristic (e.g., recentness of use, etc.). Furthermore, computing device 2 may determine, that a first window from the set of windows has a particular relationship with a second window from the set of windows. Computing device 2 may output, responsive to the determining, and for display by presence sensitive display 102 and/or the remote devices, a visual indication of the first window, wherein the visual indication of the first window visually differentiates the first window from windows from the set of windows not having the particular relationship with the second window.

Figure 4:
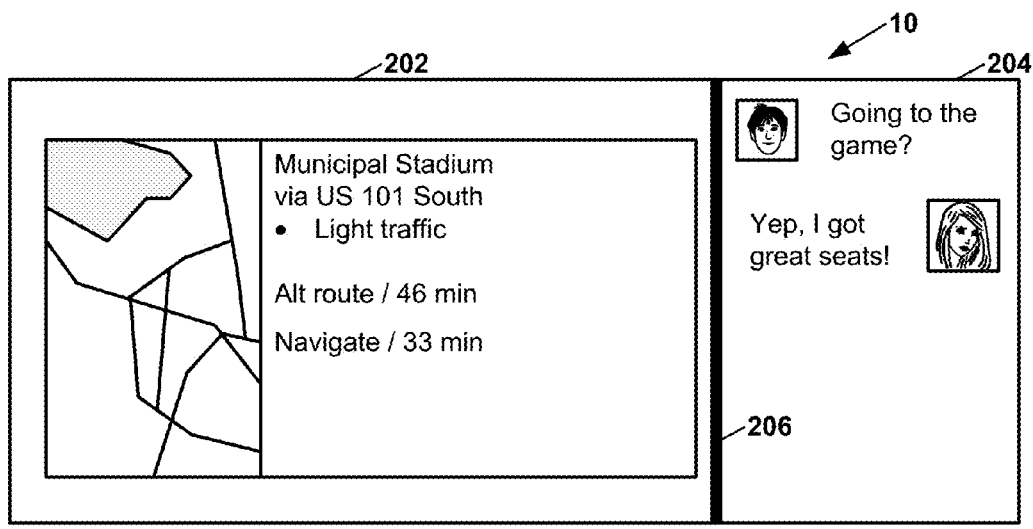
FIG. 4 is conceptual diagram illustrating an example configuration of a window utilization graphical user interface (GUI), in accordance with an example of this disclosure.

FIGS. 4-8 are conceptual diagrams illustrating an example sequence of user interface configurations that computing device 2 may output for display when the user interacts with computing device 2 to replace one window in a window utilization GUI with another. Particularly, FIG. 4 is conceptual diagram illustrating an example configuration of window utilization GUI 10, in accordance with an example of this disclosure. In this disclosure, a user interface configuration or a configuration of a user interface may refer to particular state of a user interface. In the example configuration of window utilization GUI 10 of FIG. 4, window utilization GUI 10 includes a left window 202 and a right window 204. In the example of FIG. 4, left window 202 includes traffic information and right window 204 includes a chat session.

In the example of FIG. 4, window utilization GUI 10 includes a bar 206 (i.e., a window resizing bar) that separates left window 202 and right window 204. Computing device 2 may modify the relative sizes of left window 202 and right window 204 in response to receiving an indication of user input to drag bar 206 left or right. Furthermore, in some examples, responsive to receiving an indication of user input to drag bar 206 all the way to the right edge of window utilization GUI 10, computing device 2 may modify window utilization GUI 10 such that window utilization GUI 10 only includes left window 202. Likewise, responsive to receiving an indication of user input to drag bar 206 all the way to the left edge of window utilization GUI 10, computing device 2 may modify window utilization GUI 10 such that window utilization GUI 10 only includes right window 204.

In other examples, window utilization GUI 10 may be divided vertically instead of horizontally as shown in FIG. 4 and bar 206 may be horizontal instead of vertical. Furthermore, in other examples, window utilization GUI 10 may include more than two windows and, hence, more than one window resizing bar.

Figure 5:
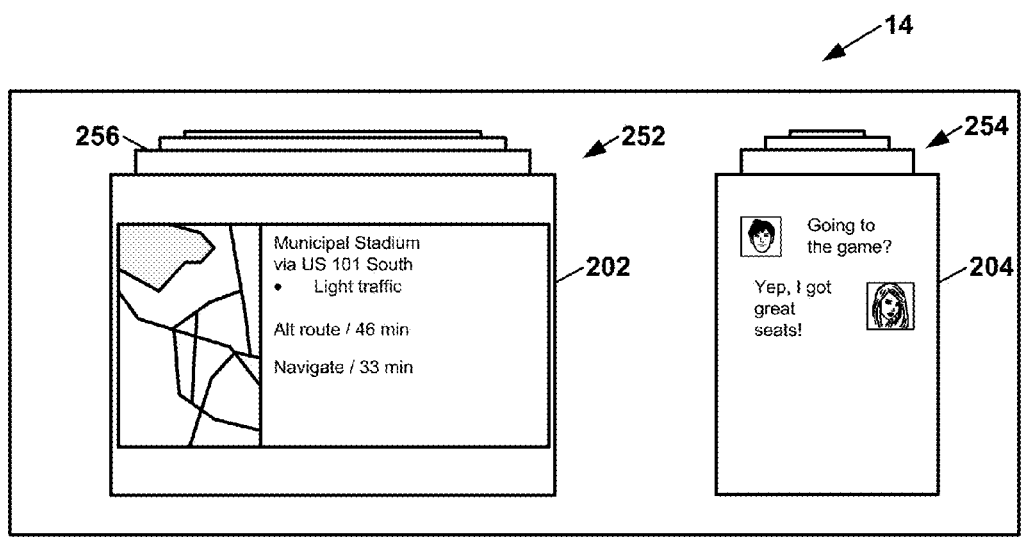
FIG. 5 is a conceptual diagram illustrating an example configuration of a window selection GUI, in accordance with an example of this disclosure.

FIG. 5 is a conceptual diagram illustrating an example configuration of window selection GUI 14, in accordance with an example of this disclosure. Computing device 2 may output window selection GUI 14 for display in place of window utilization GUI 10 (FIG. 4) in response to receiving an indication of a particular user input while window utilization GUI 10 (FIG. 4) is displayed. For example, computing device 2 may output window selection GUI 14 for display in place of window utilization GUI 10 in response to receiving an indication of the "push" gesture described elsewhere in this disclosure.

In the first example configuration of window selection GUI 14, window selection GUI 14 includes a left stack 252 and a right stack 254. Because window 202 was the window in the left side of window utilization GUI 10 when computing device 2 received the indication of the user input to display window selection GUI 14, window 202 is the head window of left stack 252. Otherwise stated, window 202 was the displayed on the left side of window utilization GUI 10 in FIG. 4 because window 202 was the head window of left stack 252 when window selection GUI 14 was last displayed. Likewise, because window 204 was the window in the right side of window utilization GUI 10 when computing device 2 received the indication of the user input to display window selection GUI 14, window 204 is the head window of right stack 254. Otherwise stated, window 204 was the displayed on the right side of window utilization GUI 10 in FIG. 4 because window 204 was the head window of right stack 254 when window selection GUI 14 was last displayed. Furthermore, as shown in FIG. 5, a window 256 occurs in stack 252 at a next to highest position in stack 252. In other words, window 256 occurs immediately beneath window 202 in stack 252.

Figure 6:
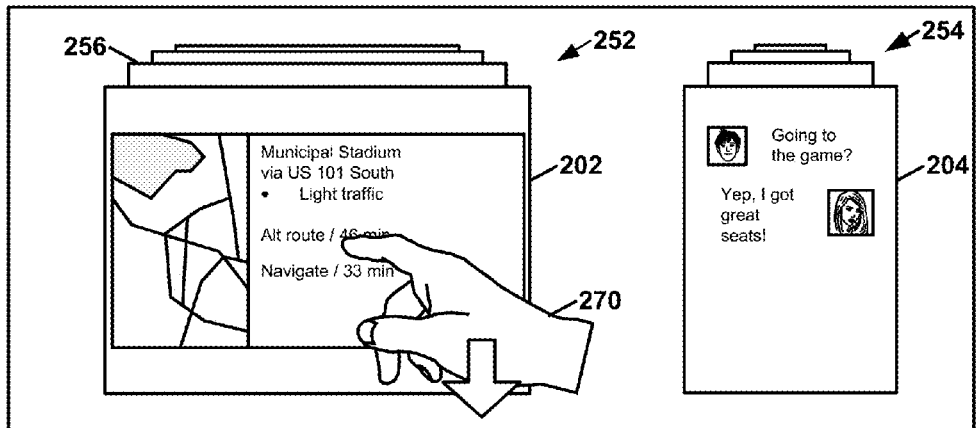
FIG. 6 is a conceptual diagram illustrating an example configuration of the window selection GUI, in accordance with an example of this disclosure.

FIG. 6 is a conceptual diagram illustrating an example configuration of window selection GUI 14, in accordance with an example of this disclosure. The content of the second example configuration of window selection GUI 14 is the same as that shown in FIG. 5. However, as shown in the example of FIG. 6, computing device 2 receives an indication of a user input of a downward swipe gesture of a user's hand 270 at a region of window selection GUI 14 associated with stack 252. The region of window selection GUI 14 associated with stack 252 may include a region or space at which a user perceives stack 252 to be displayed.

Figure 7:
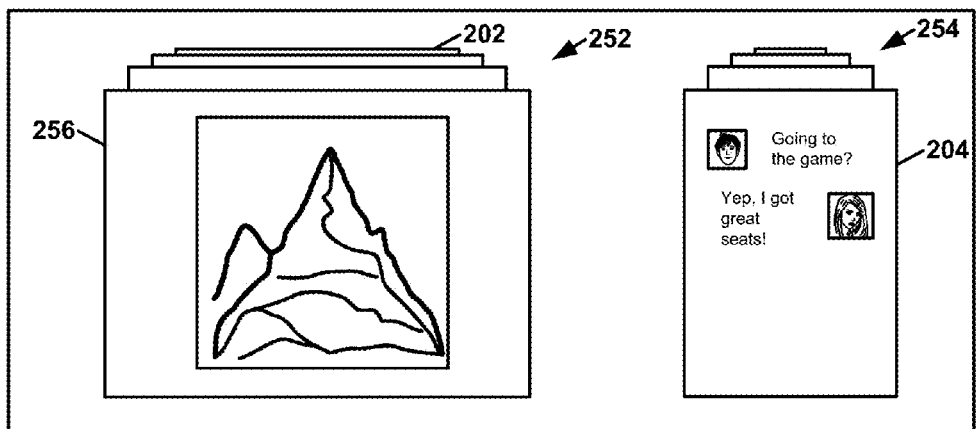
FIG. 7 is a conceptual diagram illustrating an example configuration of the window selection GUI, in accordance with an example of this disclosure.

FIG. 7 is a conceptual diagram illustrating an example configuration of window selection GUI 14, in accordance with an example of this disclosure. Computing device 2 may output the configuration of window selection GUI 14 shown in FIG. 7 in response to receiving the indication of the user input shown in FIG. 6. As shown in the example of FIG. 7, window 202, which was previously the head window of stack 252, is relegated to the lowest position in stack 252. Furthermore, as shown in the example of FIG. 7, window 256, which was previously at the next-to-highest position in stack 252, is now the head window of stack 252. In the example of FIG. 7, window 256 shows a picture of a mountain.

Figure 8:
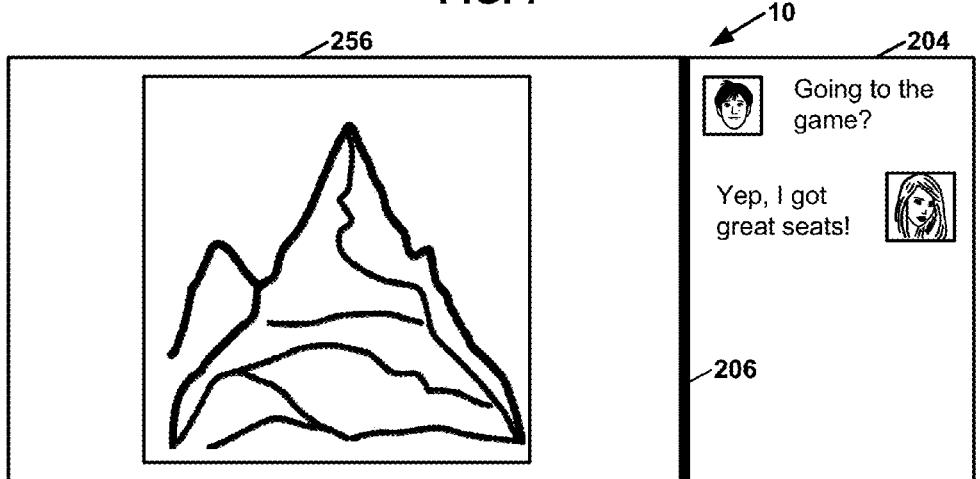
FIG. 8 is a conceptual diagram illustrating an example configuration of the window utilization GUI, in accordance with an example of this disclosure.

FIG. 8 is a conceptual diagram illustrating an example configuration of window utilization GUI 10, in accordance with an example of this disclosure. Computing device 2 may output the configuration of window utilization GUI 10 of FIG. 8 in place of the configuration of window selection GUI 14 of FIG. 7. In some examples, computing device 2 may output the configuration of window utilization GUI 10 shown in FIG. 8 in place of the configuration of window selection GUI 14 shown in FIG. 7 in response to receiving an indication of a user input to exit window selection GUI 14 while the configuration of window selection GUI 14 shown in FIG. 7 is displayed. Because windows 256 and 204 were the head windows of left stack 252 and right stack 254, respectively, in the configuration of window selection GUI 14 shown in FIG. 7, the left and right sides of window utilization GUI 10 include window 256 and 204, respectively.

Figure 9B:
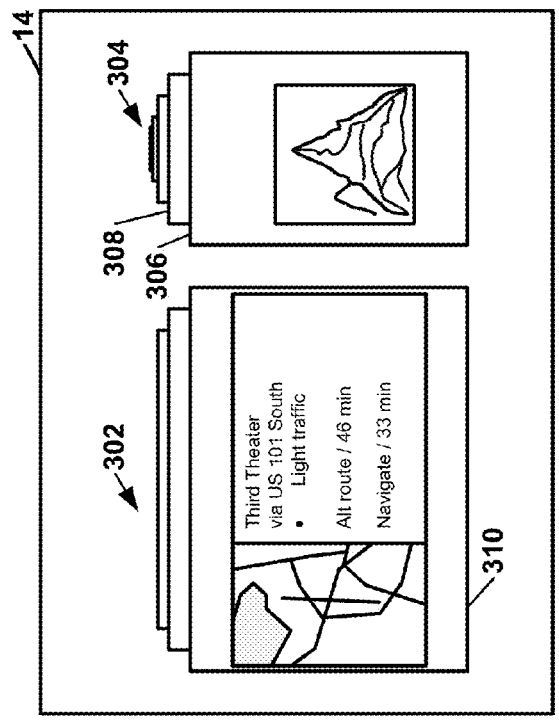
FIG. 9B is a conceptual diagram illustrating an effect of the example gesture of FIG. 9A.
Figure 9A:
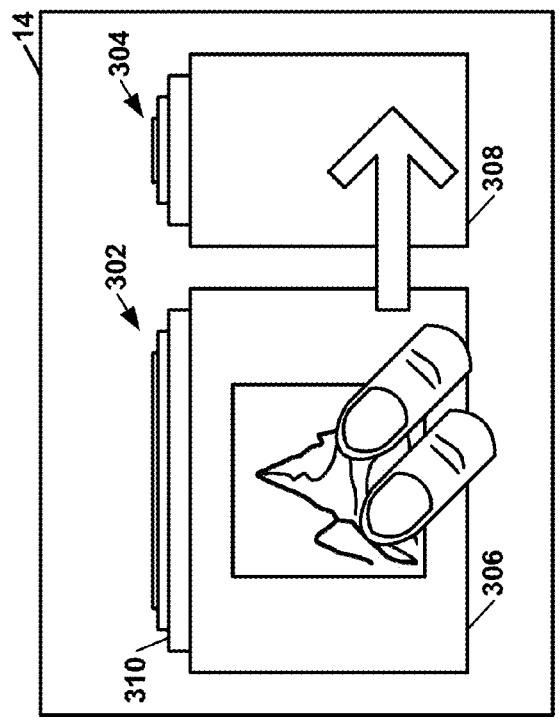
FIG. 9A is a conceptual diagram illustrating an example gesture to move a window from one visual stack to another visual stack in the window selection GUI, in accordance with an example of this disclosure.

FIG. 9A is a conceptual diagram illustrating an example gesture to move a window from one stack to another stack in a window selection GUI 14, in accordance with an example of this disclosure. FIG. 9B is a conceptual diagram illustrating an effect of the example gesture of FIG. 9A, in accordance with an example of this disclosure. In the example of FIG. 9A, window selection GUI 14 includes stack 302 and stack 304. Stack 302 includes four windows. Stack 304 also includes four windows. Furthermore, in FIG. 9A, window 306 is the head window of stack 302 and window 308 is the head window of stack 304. Window 310 is the next-highest window in stack 302.

Computing device 2 may move a window from stack 302 to stack 304, or vice versa in response to receiving an indication of user input to do so. For instance, in the example of FIGS. 9A and 9B, computing device 2 may move window 306 from stack 302 to stack 304 in response to a two-fingered drag gesture originating at an area associated with stack 302 and terminating at an area associated with stack 304. In the example of FIGS. 9A and 9B, when computing device 2 moves window 306 from stack 302 to stack 304, computing device 2 modifies stack 302 such that the window 310 is now the head window of stack 302. Furthermore, when computing device 2 moves window 306 from stack 302 to stack 304, window 308 because the next-highest window in stack 304. As shown in FIG. 9B, as a result of moving window 306 from stack 302 to stack 304, stack 302 includes three windows and stack 304 includes five windows. By providing user input to move a window from one stack to another stack, the user may control whether the window is displayed in a left or right side of window utilization GUI 10.

Figure 10A:
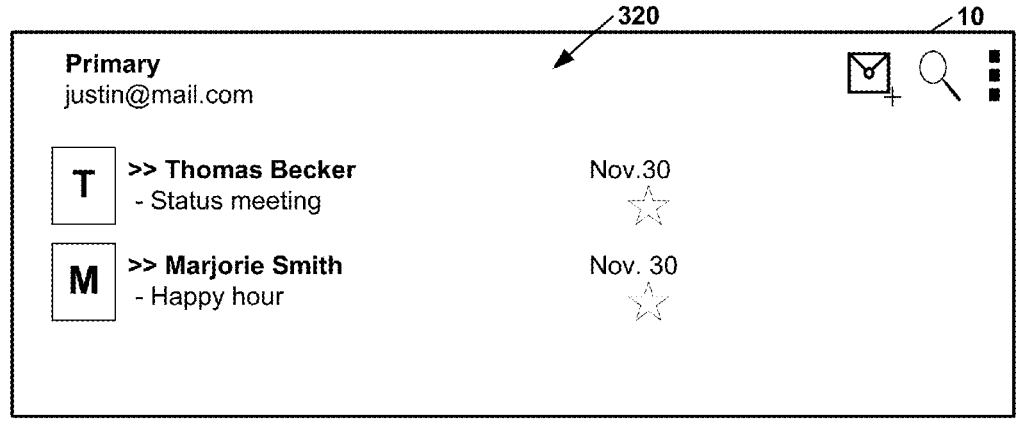
FIG. 10A is a conceptual diagram illustrating an example configuration of the window utilization GUI, in accordance with an example of this disclosure.
Figure 10B:
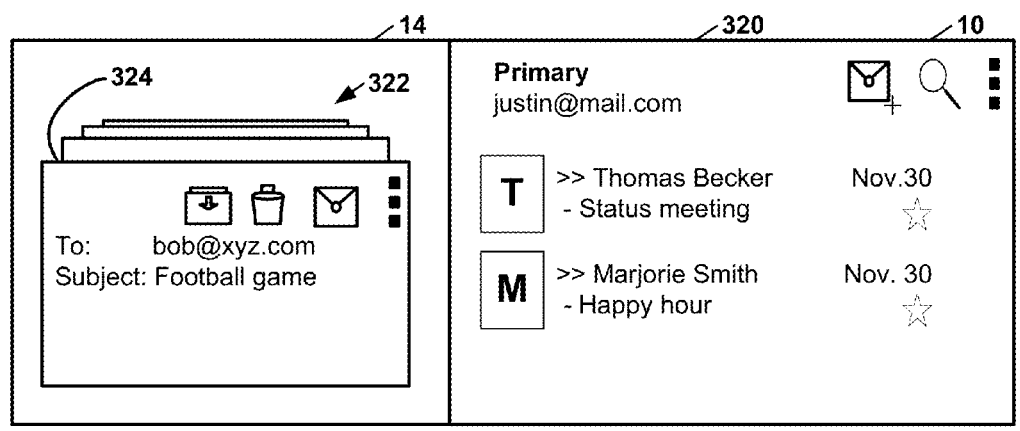
FIG. 10B is a conceptual diagram in which the window selection GUI and the window utilization GUI are displayed concurrently, in accordance with an example of this disclosure.
Figure 10C:
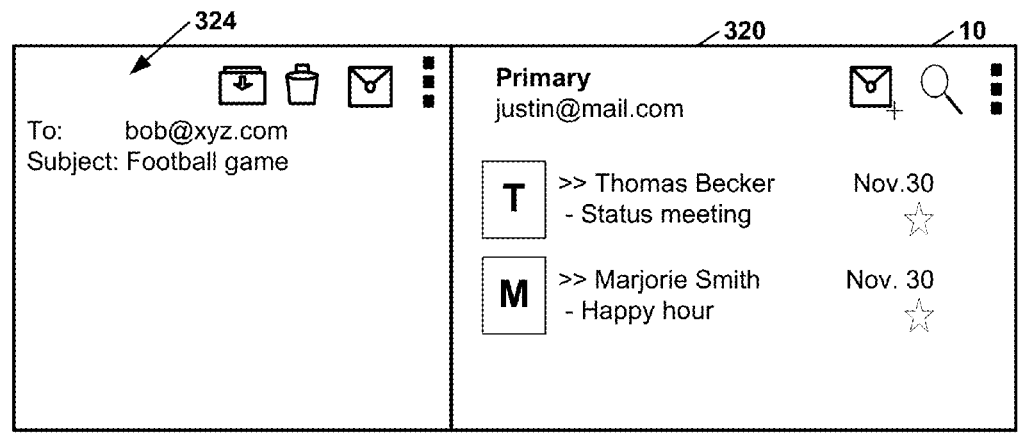
FIG. 10C is a conceptual diagram in which the window utilization GUI includes a window already included in the window utilization GUI and a head window of a stack, in accordance with an example of this disclosure.

FIGS. 10A-10C are conceptual diagrams illustrating an example of this disclosure that enables a user to select a window to be included in window utilization GUI 10 from a stack that only includes windows having a particular relationship with a window included in window utilization GUI 10. In particular, FIG. 10A is a conceptual diagram illustrating an example configuration of window utilization GUI 10, in accordance with an example of this disclosure. Window utilization GUI 10 includes a window 320. In the example of FIG. 10A, window 320 comprises an email inbox.

Responsive to receiving an indication of user input, window management module 6 may output window selection GUI 14 for display such that window selection GUI 14 and window utilization GUI 10 are concurrently displayed. In various examples, window management module 6 may output window selection GUI 14 for display concurrent with window utilization GUI 10 in response to receiving indications of various user inputs. For example, window management module 6 may output window selection GUI 14 for display concurrent with window utilization GUI 10 in response to receiving a particular multi-touch gesture, a swiping gesture originating at a particular area of a display screen, or other types of gestures or user inputs.

FIG. 10B is a conceptual diagram in which window selection GUI 14 and window utilization GUI 10 are displayed concurrently, in accordance with an example of this disclosure. As shown in FIG. 10B, window selection GUI 14 includes a stack 322. Window 324 is the current head window of stack 322. While window selection GUI 14 and window utilization GUI 10 are concurrently displayed, window management module 6 may update which window is the head window of stack 322 in response to receiving an indication of user input. In the examples of FIGS. 10A-10C, window management module 6 does not update any window included in window utilization GUI 10 when updating which window in stack 322 is the head window of stack 322.

Furthermore, while window selection GUI 14 and window utilization GUI 10 are concurrently displayed (as shown in the example of FIG. 10B), window management module 6 may receive an indication of a user input to exit window selection GUI 14. In response to receiving the indication of the user input to exit window selection GUI 14, window management module 6 may remove window selection GUI 14 from view and may output window utilization GUI 10 such that window utilization GUI 10 includes both the window or windows already included in window utilization GUI 10 (e.g., window 320) and the head window of stack 322 (e.g., window 324). FIG. 10C is a conceptual diagram in which window utilization GUI 10 includes a window (e.g., window 320) already included in window utilization GUI 10 and a head window of stack 322 (e.g., window 324), in accordance with an example of this disclosure.

In some examples, each window in stack 322 has a particular relationship to the window currently shown in window utilization GUI 10 (e.g., window 320). Other windows may be open, but window management module 6 does not include the windows in stack 322. For instance, in the example of FIG. 10B, the window currently shown in window utilization GUI 10 (e.g., window 320) comprises an email inbox and each window in stack 322 may comprise a different email message opened from the email inbox. Because stack 322 only includes windows having the particular relationship with the window currently included in window utilization GUI 10, the user may be able to easily select one of the windows in stack 322 to be the head window of stack 322 (and hence which window to include in window utilization GUI 10 alongside window 320) without scanning through windows that do not have the particular relationship with the window currently included in window utilization GUI 10.

In the examples of FIGS. 10A-10C, each of the windows in stack 322 may be a child window of window 320. Conversely, window 320 may be the parent window of each window in stack 322. As shown in the examples of FIGS. 10A-10C, the creation and maintenance of the parent-child relationships between windows may enable a user to conceptually invoke "whistles." In this disclosure, "whistles" refer generally to modes of filtering a stack or group of one or more windows (e.g., "cards") based on relationships. Hence, in some examples of this disclosure, a user may perform a gesture (e.g., a multi-touch gesture) to invoke a "whistle" to summon a set of related windows. The gesture may be performed in a particular manner and/or at a particular location of a screen, such as a parent or child window. In some examples, window management module 6 may apply visual effects, such as highlighting, to related cards responsive to receiving a gesture that invokes a particular whistle.

In some examples, the different gestures (e.g., multi-touch gestures) may trigger different "whistles" and/or indicate particular display configurations for related windows. For example, a particular multi-touch gesture performed at location of a touchscreen that displays a parent window may trigger a "whistle" for a particular set of related windows (e.g., child windows). In this example, window management module 6 may output, responsive to the particular gesture, the related windows in a particular configuration. A different gesture (e.g., a multi-touch gesture performed a parent window) may be associated with a different "whistle." Hence, responsive to receiving an indication of the different gesture, window management module 6 output, for display, a different set of windows having a different relationship with the parent window. In an alternative example, responsive to receiving the indication of the different gesture, window management module 6 may output, for display, the same set of windows in a different configuration.

The techniques of this disclosure may provide a way for a user to instruct computing device 2 to filter a stack of windows quickly based on gestures and relationships between the windows. Because relationships rather than recentness of use may be a better or alternative way of relating windows, techniques of the disclosure may enable a user to engage in a non-linear workflow (e.g., windows become temporally scattered to different x/y and z positions within stacks) and quickly bring related windows back to the forefront.

Figure 11A:
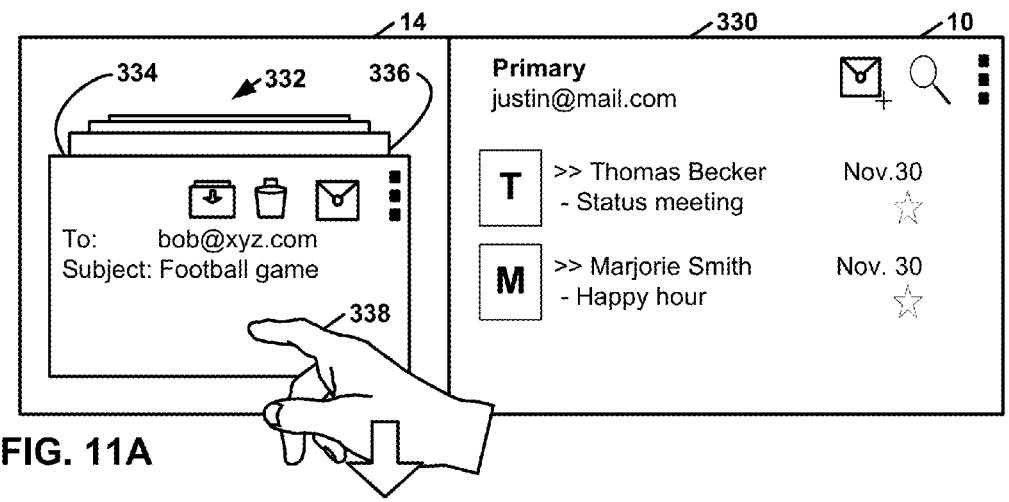
FIG. 11A is a conceptual diagram in which the window selection GUI and the window utilization GUI are displayed concurrently, in accordance with an example of this disclosure.
Figure 11B:
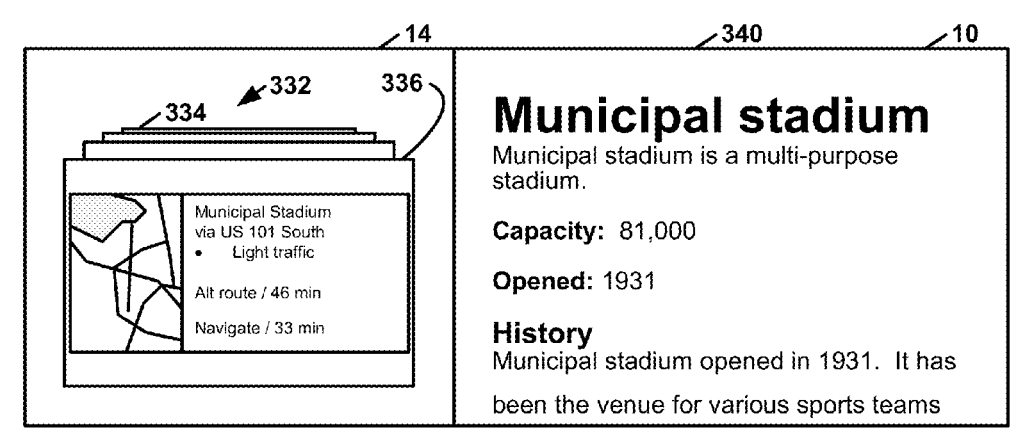
FIG. 11B is a conceptual diagram illustrating an example configuration of the window selection GUI and the window utilization GUI in which a window included in the window utilization GUI is updated when the head window of a stack displayed in window selection GUI changes, in accordance with an example of this disclosure.

FIGS. 11A-11B are conceptual diagrams illustrating an example of this disclosure in which window selection GUI 14 and window utilization GUI 10 are concurrently displayed and changing a head window of a stack in window selection GUI 14 changes the window displayed in window utilization GUI 10. FIG. 11A is a conceptual diagram in which window selection GUI 14 and window utilization GUI 10 are displayed concurrently, in accordance with an example of this disclosure. As shown in FIG. 11A, window utilization GUI 10 includes a window 330. In the example of FIG. 11A, window 330 includes an email inbox. Window selection GUI 14 includes a stack 332. Furthermore, in the example of FIG. 10A, window 334 is the head window of stack 332. Window 336 is the next highest window in stack 332. Window 334 includes a draft email message.

In the example of FIG. 11A, window management module 6 receives an indication of a downward swipe gesture directed at stack 332. Particularly, in the example of FIG. 11A, window management module 6 may receive the indication of the downward swipe gesture when a user moves a finger 338 of the user's hand in a downward direction. As shown in the example of FIG. 11B, responsive to the indication of the downward swipe gesture, window management module 6 may designate (e.g., set) the next highest window of stack 332 (i.e., window 336) as the head window of stack 332 and may designate (e.g., set) the previous head window of stack 332 as the tail window of stack 332. Furthermore, in response to receiving the indication of the downward swipe gesture, window management module 6 may output window utilization GUI 10 for display such that window utilization GUI 10 includes a window having a particular relationship with the new head window of stack 332. Thus, FIG. 11B is a conceptual diagram illustrating an example configuration of window selection GUI 14 and window utilization GUI 10 in which a window included window utilization GUI 10 is updated when the head window of a stack displayed in window selection GUI 14 changes, in accordance with an example of this disclosure.

In the example of FIG. 11B, window 336 includes a map and driving directions to "Municipal Stadium." Furthermore, in the example of FIG. 11B, window management module 6 may output window utilization GUI 10 for display such that window utilization GUI 10 includes a window 340 that has a particular relationship to window 336. In particular, in the example of FIG. 11B, window 340 includes a webpage containing information about "Municipal Stadium." In this way, a user may be able to see and interact with related windows as the user scans through windows in stack 332.

FIG. 12A is a conceptual diagram illustrating an example configuration of window selection GUI 14, in accordance with an example of this disclosure. In the example of FIG. 12A, window selection GUI 14 includes stack 350 and stack 352. Furthermore, in the example of FIG. 12A, stack 350 is a primary stack and stack 352 is a secondary stack. To visually indicate that stack 350 is the primary stack and that stack 352 is the secondary stack, windows in stack 350 are larger than windows in stack 352. In some examples, computing device 2 may change which stack (e.g., stack 350 or stack 352) is the primary stack in response to receiving an indication of user input, such as an indication of a tapping gesture at a region associated with the secondary stack.

In the example of FIG. 12A, computing device 2 may determine windows in stacks 350 and 352 that have a particular relationship with the head window of the primary stack. In the example of FIG. 12A, window 354 is the head window of the primary stack (i.e., stack 350). Furthermore, computing device 2 outputs, for display in window selection GUI 14, visual indicators that visually differentiate windows in stack 350 and stack 352 that have the particular relationship with the head window of the primary stack from windows in stack 350 and stack 352 that do not have the particular relationship with the head window of the primary stack. Particularly, in the example of FIG. 12A, the window indicators have the form of labels 356 and 358 that identify the related windows.

Hence, in the example of FIG. 12A and other examples of this disclosure, computing device 2 may output, for display, an arrangement of a set of windows organized into one or more stacks. Furthermore, computing device 2 may determine that a first window from the set of windows has a particular relationship with a second window (e.g., window 354) from the set of windows. In addition, computing device 2 may output responsive to the determining, and for display, a visual indication (e.g., label 358) of the first window and a visual indication (e.g., label 356) of the second window. The visual indication of the first window and the visual indication of the second window visually differentiate the first window and the second window from windows from the set of windows not having the particular relationship with the first window and the second window. In the example of FIG. 12A and other examples of this disclosure, the visual indication of the first window (and/or the visual indication of the second window) may comprise a textual label that indicates that the first window has the particular relationship with the second window.

FIG. 12B is a conceptual diagram illustrating an example configuration of window selection GUI 14, in accordance with an example of this disclosure. In the example of FIG. 12B, window selection GUI 14 includes stack 350 and stack 352. As in FIG. 12A, stack 350 is the primary stack and stack 354 is the secondary stack. Furthermore, FIG. 12B uses visual indicators to visually differentiate windows having a particular relationship with a head window (i.e., window 354) of the primary stack from windows that do not have the particular relationship with the head window of the primary stack. As in FIG. 12A, the visual indicators have the form of labels 356 and 358. However, FIG. 12B shows that the visual indicators (i.e., labels 356 and 358) can indicate windows in different stacks (i.e., stack 350 and stack 352).

Hence, in the example of FIG. 12B and other examples of this disclosure, computing device 2 may output, for display, an arrangement of a set of windows organized into at least a first stack and a second stack. Furthermore, computing device 2 may determine that a first window from the set of windows has a particular relationship with a second window from the set of windows. The first stack may include the first window and the second stack may include the second window. In addition, computing device 2 may output, responsive to the determining, and for display, a visual indication of the first window. The visual indication of the first window visually differentiates the first window from windows from the set of windows not having the particular relationship with the second window. In such examples, responsive to receiving an indication of a user input, computing device 2 may output, for display, in place of the first stack and the second stack, an enlarged version of a head window of the first stack and an enlarged version of a head window of the second stack. Thus, computing device 2 may output, for display, a window utilization GUI of the type shown in the example of FIG. 8.

FIG. 13A is a conceptual diagram illustrating an example configuration of window selection GUI 14, in accordance with an example of this disclosure. In the example of FIG. 13A, window selection GUI 14 includes stack 400 and stack 402. Stack 400 is the primary stack and stack 402 is the secondary stack. Window selection GUI 14 includes visual indicators that visual differentiate windows in stack 400 and stack 402 that have a particular relationship with a head window of the primary stack (i.e., window 404) from windows in stack 400 and stack 402 that do not have the particular relationship with the head window of the primary stack. Particularly, in the example of FIG. 13A, the window indicators have the form of tilted windows in stacks 400 and 402. In the example of FIG. 13A, window 406 is tilted relative to other windows in stack 400 to indicate that window 406 has a particular relationship with the head window of the primary stack (i.e., window 404 in stack 400). Thus, in the example of FIG. 13A, a window related to the head window of stack 400 by the particular relationship is "tab-peeked" in order to visually differentiate the window from windows in stack 400 that are not related to the head window of stack 400 by the particular relationship.

Hence, in the example of FIG. 13A and other examples of this disclosure, computing device 2 may output, for display, an arrangement of a set of windows organized into one or more stacks. Furthermore, computing device 2 may determine that a first window (e.g., window 406) from the set of windows has a particular relationship with a second window (e.g., window 404) from the set of windows. In addition, computing device 2 may output, responsive to the determining, and for display, a visual indication of the first window. The visual indication of the first window visually differentiates the first window from windows from the set of windows not having the particular relationship with the second window by virtue of the first window being tilted relative to each window in the one or more visual stacks that does not have the particular relationship with the second window.

FIG. 13B is a conceptual diagram illustrating an example configuration of window selection GUI 14, in accordance with an example of this disclosure. In the example of FIG. 13B, window selection GUI 14 includes stack 400 and stack 402. As in FIG. 13A, stack 400 is the primary stack and stack 402 is the secondary stack. Furthermore, FIG. 13B includes visual indicators that are similar to those shown in FIG. 13A. That is, FIG. 13B includes tilting of windows in stacks 400 and 402 to visually differentiate the windows from windows in stacks 400 and 402 not having the particular relationship with the head window of the primary stack (i.e., window 404). FIG. 13B shows that a window having the particular relationship with the head window of the primary stack may be in a secondary stack (e.g., stack 402).

FIG. 14A is a conceptual diagram illustrating an example configuration of window selection GUI 14, in accordance with an example of this disclosure. In the example of FIG. 14A, window selection GUI 14 includes stack 450 and stack 452. Stack 450 is the primary stack and stack 452 is the secondary stack. Window selection GUI 14 includes visual indicators that visual differentiate windows in stack 450 and stack 452 that have a particular relationship with a head window of the primary stack (i.e., window 454) from windows in stack 450 and stack 452 that do not have the particular relationship with the head window of the primary stack. Particularly, in the example of FIG. 14A, the window indicators have the form of horizontally displaced windows in stacks 450 and 452. In the example of FIG. 14A, window 456 is horizontally displaced relative to other windows in stack 450 to indicate that window 456 has a particular relationship with the head window of the primary stack (i.e., window 454 in stack 450). In other examples, windows in a stack that have the particular relationship with the head window of the primary stack may be vertically displaced (or displaced in another direction) relative to windows in the stack that do not have the particular relationship with the head window of the primary stack.

Hence, in the example of FIG. 14A and other examples of this disclosure, computing device 2 may output, for display, an arrangement of a set of windows organized into one or more stacks. Furthermore, computing device 2 may determine that a first window (e.g., window 456) from the set of windows has a particular relationship with a second window (e.g., window 454) from the set of windows. In addition, computing device 2 may output, responsive to the determining, and for display, a visual indication of the first window. The first window is in a particular visual stack from the one or more visual stacks. The visual indication of the first window visually differentiates the first window from windows from the set of windows not having the particular relationship with the second window by virtue of the first window being displaced within the particular visual stack relative to each window in the particular visual stack that does not have the particular relationship with the second window.

FIG. 14B is a conceptual diagram illustrating an example configuration of window selection GUI 14, in accordance with an example of this disclosure. In the example of FIG. 14B, window selection GUI 14 includes stack 450 and stack 452. As in FIG. 14A, stack 450 is the primary stack and stack 452 is the secondary stack. Furthermore, FIG. 14B includes visual indicators that are similar to those shown in FIG. 14A. That is, FIG. 14B includes horizontally displaced windows in stacks 450 and 452 to visually differentiate the windows that have the particular relationship with the head window of the primary stack (i.e., window 454) from windows in stacks 450 and 452 that do not have the particular relationship with the head window of the primary stack. FIG. 14B shows that a window having the particular relationship with the head window of the primary stack may be in a secondary stack (e.g., stack 452).

Figure 15:
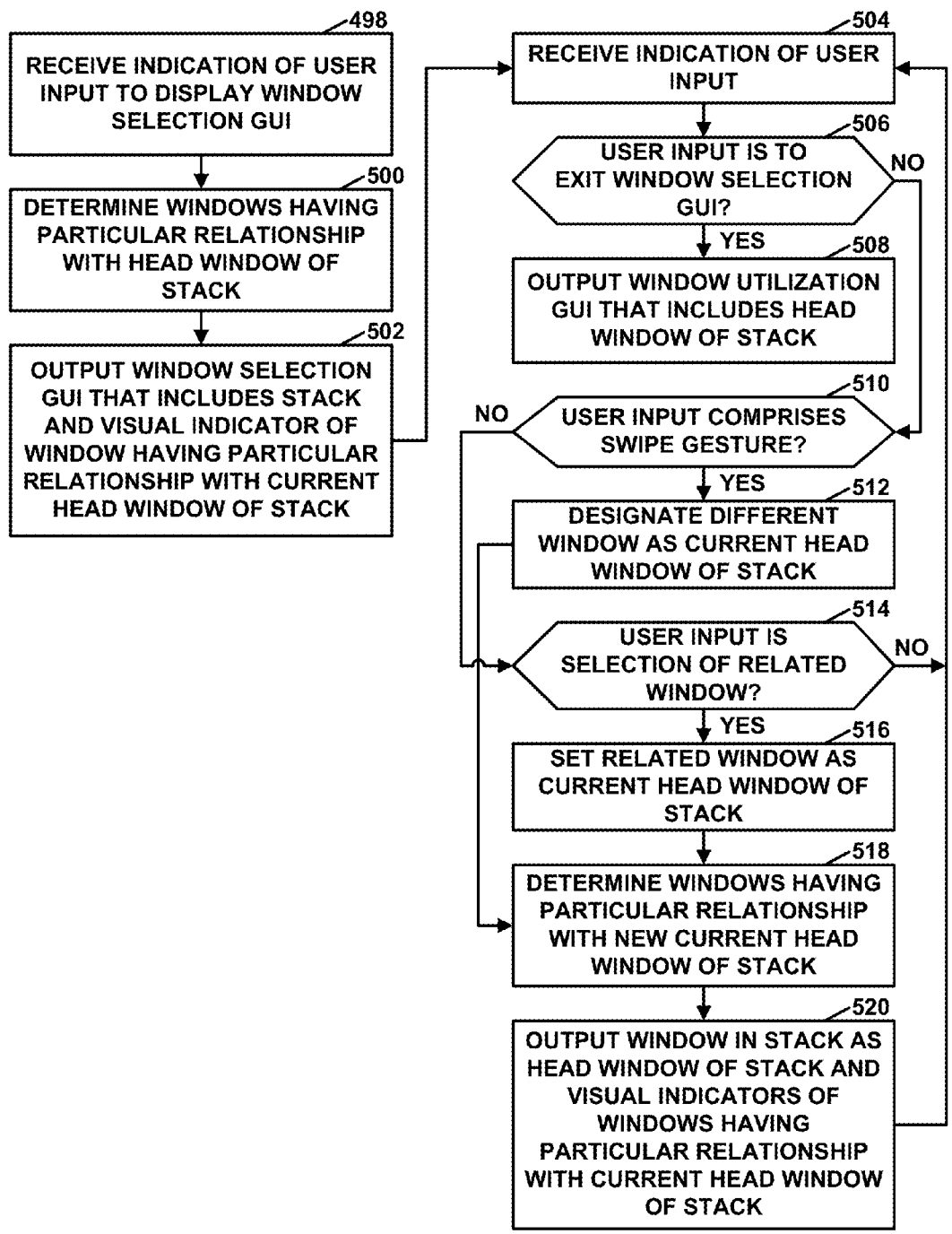
FIG. 15 is a flowchart illustrating an example operation of the computing device, in accordance with an example of this disclosure.

FIG. 15 is a flowchart illustrating an example operation of computing device 2, in accordance with an example of this disclosure. In the example of FIG. 15, computing device 2 may receive an indication of user input to display window selection GUI 14 (498). Responsive to the indication of user input to display window selection GUI 14, computing device 2 may determine windows having a particular relationship with a head window of a stack (500). In addition, computing device 2 may output, for display, window selection GUI 14 such that window selection GUI 14 includes the stack and a visual indicator of a window having the particular relationship with the current head window of the stack (502).

In the example of FIG. 15, computing device 2 may output, for display, visual indicators of windows having the particular relationship with the head window of the stack automatically. In other examples, computing device 2 may output the visual indicators in response to receiving an indication of user input to display such visual indicators. For example, computing device 2 may determine that a first window has the particular relationship with a second window (e.g., the head window of the stack). In this example, computing device 2 may output, for display, the arrangement of the set of windows organized into the one or more visual stacks without including the visual indication of the first window. Furthermore, in this example, while the arrangement of the set of windows organized into the one or more visual stacks is displayed without the visual indication of the first window, computing device 2 may receive an indication of a user input. In this example, responsive to the indication of the user input, computing device 2 may output, for display, the visual indication of the first window.

In the example of FIG. 15, while window selection GUI 14 is displayed, computing device 2 may receive an indication of user input (504). Furthermore, in the example of FIG. 15, computing device 2 may determine whether the user input is to exit window selection GUI 14 (506). Responsive to determining that the user input is to exit window selection GUI 14 ("YES" branch of 506)), computing device 2 may output window utilization GUI 10 such that window utilization GUI 10 includes the current head window of the stack, and no other windows of the stack (508). In this way, responsive to receiving an indication of a user input, computing device 2 may output, for display, in place of a particular visual stack from the one or more visual stacks, an enlarged version of a head window of the particular visual stack. The enlarged version of the head window may be enlarged relative to the version of the head window as shown in the particular stack.

On the other hand, responsive to determining that the user input is not to exit window selection GUI 14 ("NO" branch of 506), computing device 2 may determine whether the user input comprises a swipe gesture (510). For instance, computing device 2 may determine whether the user input comprises an upward or downward swipe gesture. Responsive to determining that the user input comprises a swipe gesture ("YES" branch of 510), computing device 2 may designate (e.g., set) a different window of the stack as the current head window of the stack (512). In some examples, computing device 2 may designate different windows of the stack as the current head window of the stack depending on a direction of the swipe gesture. For example, if the direction of the swipe gesture is generally upward, computing device 2 may set a tail window of the stack as the current head window of the stack. In this example, if the direction of the swipe gesture is generally downward, computing device 2 may set the window beneath the current head window of the stack as the new current head window of the stack. A similar example involves swipe gestures in leftward and rightward directions.

In the example of FIG. 15, responsive to determining that the user input does not comprise a swipe gesture ("NO" branch of 510), computing device 2 may determine whether the user input comprises a selection of a related window in the stack (514). Responsive to determining that the user input does not comprise a selection of a related window in the stack ("NO" branch of 514), computing device 2 may wait to receive additional user input (504). In other examples, computing device 2 may perform other functions in response to determining that the user input does not comprise a selection of a related window in the stack.

For example, computing device 2 may output, for display in window selection GUI 14, a label to indicate that the related window in the stack is related to the head window of the stack. In this example, computing device 2 may determine that the user input comprises a selection of the related window when the user input comprises a selection of the label. In another example, computing device 2 may output, for display in window selection GUI 14, the related window in the stack such that the related window is tilted or displaced relative to non-related windows in the stack. Because the related window is tilted or displaced relative to non-related windows in the stack, there may be an area at which the user can perform a tapping gesture on the related window to select the related window. Responsive to determining that the user input comprises a selection of the related window ("YES" branch of 514), computing device 2 may designate (e.g., set) the related window as the current head window of the stack (516). Furthermore, in some examples, when the user input comprises a selection of the related window, computing device 2 may designate the previous head window of the stack as the second highest window in the stack.

In the example of FIG. 15, after designating (e.g., setting) a window as the head window of the stack in actions 512 or 516, computing device 2 may determine windows from the stack having a particular relationship with the current head window of the stack (518). Computing device 2 may output, for display, window selection GUI 14 such that the current head window of the stack is shown as the current head window of the stack and such that window selection GUI 14 include visual indicators of windows having the particular relationship with the current head window of the stack (520). In this way, a particular window may be the head window of a particular visual stack from the one or more visual stacks and computing device 2 may receive an indication of a user input. Responsive to the indication of the user input, computing device 2 may output, for display, the particular visual stack such that another window in the particular visual stack is visually indicated as currently being the head window of the particular visual stack. After performing action 520, computing device 2 may wait to receive an addition indication of user input (504) and the operation of FIG. 15 may continue.

Figure 16:
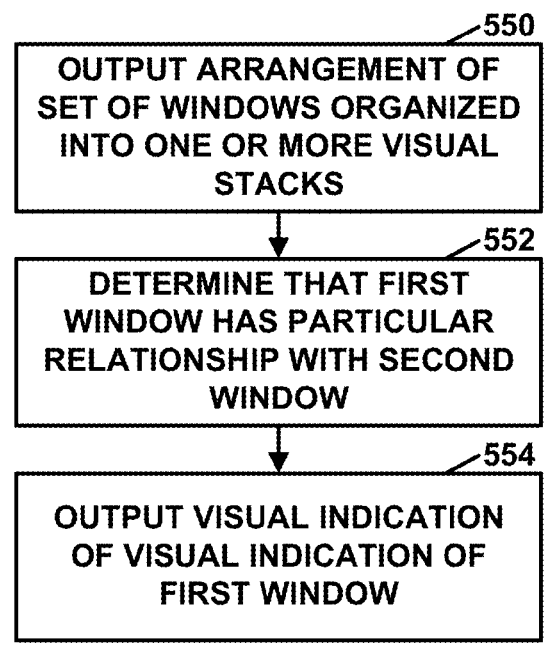
FIG. 16 is a flowchart illustrating an example operation of the computing device, in accordance with an example of this disclosure.

FIG. 16 is a flowchart illustrating an example operation of computing device 2, in accordance with an example of this disclosure. In the example of FIG. 16, computing device 2 may output an arrangement of a set of windows organized into one or more stacks (550). Each respective stack from the one or more stacks may comprise a respective subset of the set of windows sequenced based on a characteristic. Furthermore, computing device 2 may determine that a first window from the set of windows has a particular relationship with a second window from the set of windows, wherein the particular relationship is not based on the characteristic (552). Computing device 2 may output, responsive to the determining, a visual indication of the first window (554). The visual indication of the first window visually differentiates the first window from windows from the set of windows do not have the particular relationship with the second window. Although FIG. 16 shows actions 550 and 552 as occurring separately, in some examples actions 550 and 552 may occur concurrently, such that computing device 2 outputs the visual indication for display at the same time that computing device 2 outputs that arrangement of the set of windows for display.

Figure 17:
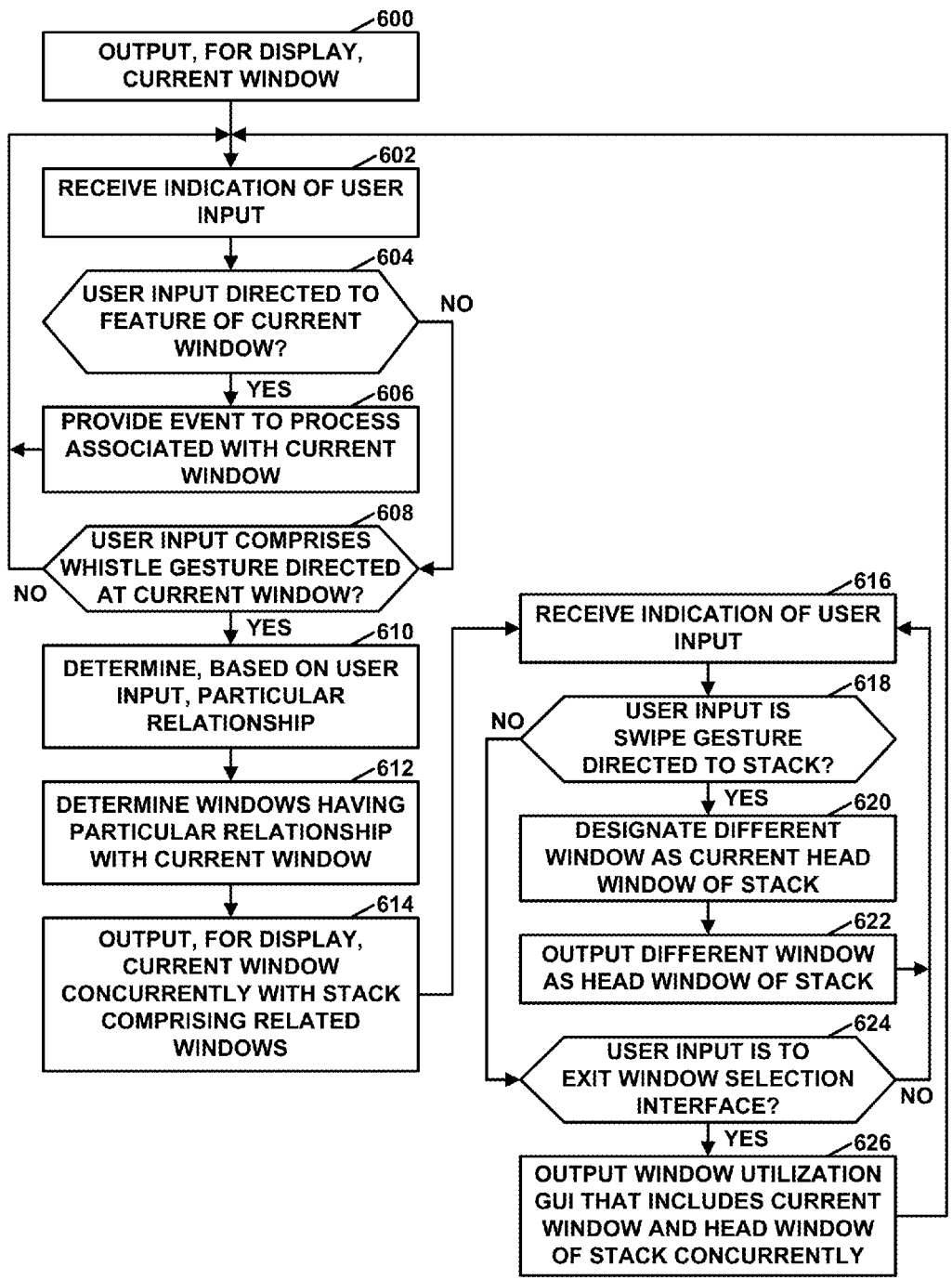
FIG. 17 is a flowchart illustrating an example operation of the computing device, in accordance with an example of this disclosure.

FIG. 17 is a flowchart illustrating an example operation of computing device 2, in accordance with an example of this disclosure. The example operation of FIG. 17 may be consistent with the example user interface configurations shown in FIGS. 10A-10C. That is, the example of FIG. 17 may enable a user to instruct computing device 2 to output, for display, a stack of windows that each have a particular relationship to a currently displayed window. In this example, the user may select, from the stack, one of the windows to be displayed concurrently alongside the current window.

In the example of FIG. 17, window management module 6 may output, for display, a current window (600). For instance, in the example of FIG. 10A, window management module 6 may output window 320 for display. Furthermore, in the example of FIG. 17, window management module 6 may receive an indication of a user input (602). For instance, window management module 6 may receive an indication of a multi-touch gesture, a "pushing" gesture, or another type of gesture.

Responsive to receiving the indication of the user input, window management module 6 may determine whether the user input is directed to a user interface feature of the current window (604). For instance, in the example of FIG. 10A, window management module 6 may determine whether the user input is directed to one of the onscreen buttons of window 320 (e.g., the new mail button, the search button, the more options control, etc.). Responsive to determining that the user input is directed to a user interface feature of the current window ("YES" branch of 604), window management module 6 may provide an appropriate event to a process associated with the current window (606). For instance, in the example of FIG. 10A, window management module 6 may provide an event to an email application. The event may provide information about the user input.

On the other hand, in response to determining that the user input is not directed to a user interface feature of the current window ("NO" branch of 604), window management module 6 may determine whether the user input comprises a whistle gesture directed at the current window (608). For instance, window management module 6 may determine whether the user input comprises a multi-touch gesture directed at a location at which a user perceives the current window to be displayed. A multi-touch gesture may be a gesture concurrently involving two or more input objects (e.g., styli, fingers, etc.). For example, window management module 6 may determine that the user input comprises a whistle gesture when the user input comprises a linear movement of three fingers across a location at which the user perceives the current window to be displayed.

Responsive to determining that the user input does not comprise a whistle gesture directed at the current window ("NO" branch of 608), window management module 6 may receive another indication of user input (602) and the operation of FIG. 17 may continue. In other examples, window management module 6 may provide other functionality when the user input is not directed to a user input feature of the current window or the user input does not comprise a whistle gesture directed at the current window.

However, in response to determining that the user input comprises a whistle gesture directed at the current window ("YES" branch of 608), window management module 6 may determine, based on the user input, a particular relationship associated with the whistle gesture (610). For example, different relationships may be associated with different whistle gestures. In this example, an upward movement of three fingers may be associated with a first relationship and a downward movement of three fingers may be associated with a second, different relationship. Furthermore, window management module 6 may determine windows having the particular relationship with the current window (612). Because different windows may have different relationships with the current window, window management module 6 may determine different sets of windows for different whistle gestures. For ease of explanation, this disclosure may refer to the windows having the particular relationship with the current window as the "related windows."

In addition, window management module 6 may output, for display, the current window concurrently with a stack comprising the related windows (614). While current window and the stack are displayed concurrently, window management module 6 may receive an indication of user input (616). Subsequently, window management module 6 may determine whether the user input is a swipe gesture directed to the stack (618). Responsive to determining that the user input is a swipe gesture directed to the stack ("YES" branch of 618), window management module 6 may designate (e.g., set) a different window of the stack as the current head window of the stack (620). For instance, prior to designating (e.g., setting) the different window as the head window, the different window may have been the tail window of the stack or the next highest window of the stack. In addition, window management module 6 may output, for display, the different window as the head window of the stack (622). In other examples, window management module 6 may perform actions 618-622 with respect to other types of user input. Window management module 6 may then receive an additional indication of user input (616).

On the other hand, in response to determining that the user input is not a swipe gesture directed to the stack ("NO" branch of 618), window management module 6 may determine whether the user input is to exit the window selection interface containing the stack (624). Responsive to determining that the user input is to exit the window selection interface containing the stack ("YES" branch of 624), window management module 6 may output, for display, a window utilization GUI that includes the current window and the head window of the stack concurrently (626). In this way, the user may be able to use the current window and the head window of the stack in a split-screen fashion. For instance, in the example of FIG. 10C, the user may be able to use window 324 and window 320 concurrently in a split-screen fashion. Subsequently, window management module 6 may receive an indication of additional user input (600), and the example operation of FIG. 17 may continue.

Thus, in the example of FIG. 17, computing device 2 may output, for display, a first window. Responsive to receiving an indication of a first user input directed to the first window, computing device 2 may determine, based on the first user input, a relationship. In addition, computing device 2 may determine a plurality of windows having the relationship with the first window. Furthermore, computing device 2 may output, for display, a visual stack of the windows that have the relationship with the window. In addition, computing device 2 may receive an indication of a second user input. Responsive to receiving the indication of the second user input, computing device 2 may output, for display, the first window and a head window of the visual stack concurrently and without outputting the visual stack for display.

Figure 18A:
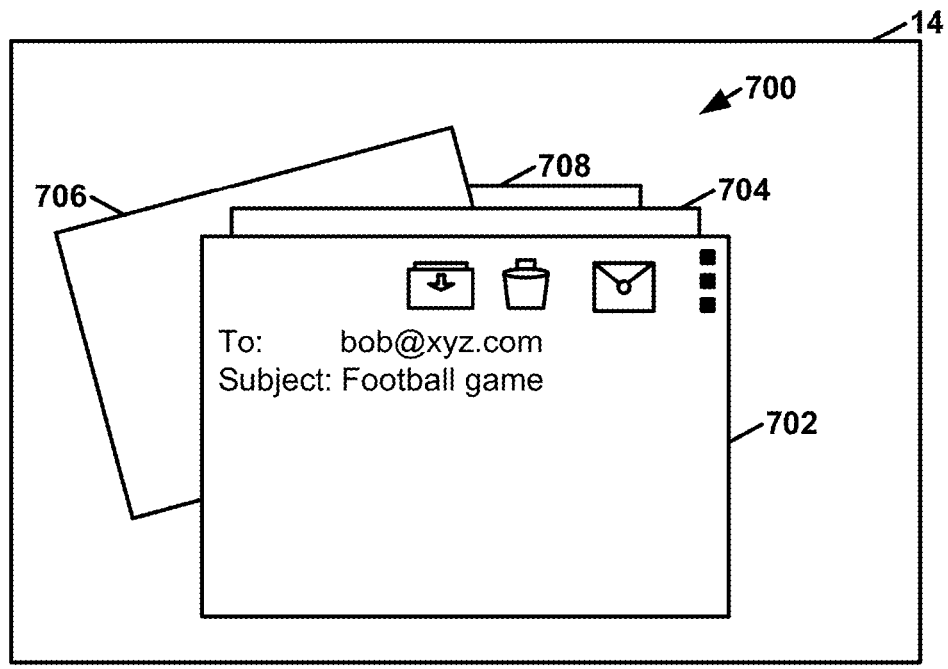
FIG. 18A is a conceptual diagram illustrating an example configuration of the window selection GUI, in accordance with an example of this disclosure.

FIG. 18A is a conceptual diagram illustrating an example configuration of window selection GUI 14, in accordance with an example of this disclosure. In the example of FIG. 18A, window selection GUI 14 includes a stack 700. Although not shown in the example of FIG. 18A, window selection GUI 14 may include one or more stacks in addition to stack 700. Stack 700 includes windows 702, 704, 706, and 708. Window 702 is the head window of stack 700.

In the example of FIG. 18A, window 706 has a particular relationship with the head window of stack 700 (i.e., window 702). Accordingly, computing device 2 may output, for display, a visual indication that that window 706 has the particular relationship with the head window of stack 700.

Particularly, in the example of FIG. 18A, the visual indication visually differentiates window 706 from other windows in stack 700 by virtue of window 706 being tilted relative to the other windows in stack 700. In other examples, the visual indication may otherwise visually differentiate windows having the particular relationship with the head window of stack 700.

In some instances, the user may want to hide windows in stack 700 that do not have the particular relationship with the head window of stack 700. This may allow the user to more quickly find a desired window from among the windows having the particular relationship with the head window of stack 700. Accordingly, computing device 2 may, responsive to receiving an indication of a user input, output window selection GUI 14 for display such that stack 700 only includes the head window of stack 700 and windows having the particular relationship with the head window of stack 700.

Figure 18B:
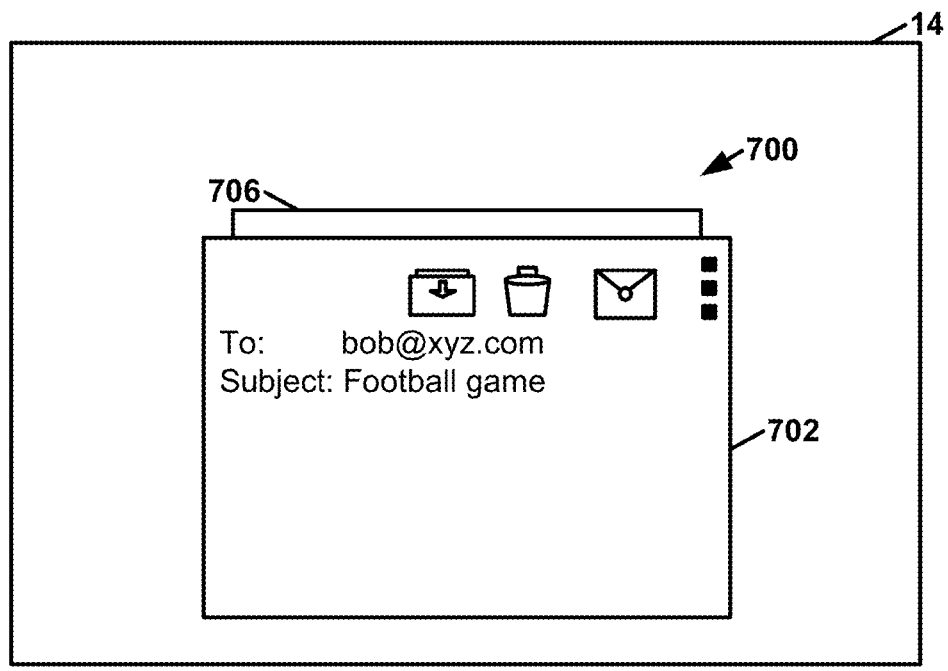
FIG. 18B is a conceptual diagram illustrating an example configuration of the window selection GUI in which windows not having a particular relationship with a head window of a stack are hidden, in accordance with an example of this disclosure.

FIG. 18B is a conceptual diagram illustrating an example configuration of window selection GUI 14 in which windows not having the particular relationship with the head window of stack 700 are hidden, in accordance with an example of this disclosure. In the example of FIG. 18A, only window 706 has the particular relationship with the head window of stack 700 (i.e., window 702). Hence, in the example of FIG. 18B, only windows 702 and 706 are shown in stack 700. Windows 704 and 708 are hidden.

In this way, a particular visual stack (e.g., stack 700) from one or more visual stacks may include one or more windows having the particular relationship with a particular window (e.g., window 702) and one or more windows not having the particular relationship with the particular window. Responsive to receiving an indication of a user input, computing device 2 may output the particular visual stack for display such that the particular visual stack only includes the particular window and the one or more windows having the particular relationship with the particular window.

Computing device 2 may output window selection GUI 14 for display such that stack 700 only includes the head window of stack 700 and windows having the particular relationship with the head window of stack 700 in response to indications of various types of user input. Such types of user input may include swipe gestures, tap gestures, press-and-hold gestures, keyboard or button input, voice input, and so on.

This disclosure includes various examples in which computing device 2 receives indications of user input. In some such examples, the user input may comprise gestures, such as multi-touch gestures, swipe gestures, "push" gestures, and so on. In at least such examples, equivalent examples may exist in which voice commands are employed in place of gestures. Furthermore, this disclosure includes examples where windows are included in a window utilization GUI (e.g., window utilization GUI 10). Similar examples may be provided in which, instead of such windows being included the window utilization GUI, the windows are displayed such that the user interface features of the windows are enabled for use by a user or the windows are otherwise displayed outside the context of a user interface for selecting windows.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   outputting, by a computing device, for display, a first arrangement of a set of windows organized into at least two visual stacks, wherein:
      each respective visual stack from the at least two visual stacks comprises a respective subset of the set of windows sequenced based on a characteristic,
      a first stack from the at least two visual stacks comprises a first window from the set of windows, and a second stack from the at least two visual stacks comprises a second window from the set of windows, and
      the second stack is separate from the first stack;
   determining, by the computing device, that the first window has a particular relationship with the second window, wherein the particular relationship is not based on the characteristic; and
   responsive to determining that the first window has the particular relationship with the second window and responsive to receiving, by the computing device, an indication of a user input associated with the second window, outputting, by the computing device, for display, a second arrangement of the set of windows organized into the at least two visual stacks, the second arrangement including a visual indication of the first window that visually indicates that the first window has the particular relationship with the second window and visually differentiates the first window from other windows from the first stack that do not have the particular relationship with the second window from the second stack, wherein the visual indication of the first window tilts the first window relative to each of the other windows in the first stack that do not have the particular relationship with the second window.

2. The method of claim 1, further comprising:
   designating, by the computing device, the second window as a head window of the second stack, wherein determining that the first window has the particular relationship with the second window comprises, responsive to designating the second window as the head window of the second stack, determining whether the first window has the particular relationship with the second window.

3. The method of claim 2, further comprising:
   responsive to receiving an indication of additional user input, outputting, by the computing device, for display, in place of the second stack, an enlarged version of the head window of the second stack.

4. The method of claim 2, the method further comprising:
   receiving, by the computing device, an indication of additional user input; and
   responsive to the indication of the additional user input, outputting, by the computing device, for display, the second stack such that the second window is visually indicated as currently being the head window of the second stack.

5. The method of claim 1, further comprising:
   responsive to receiving an indication of additional user input, outputting, by the computing device, for display, in place of the at least two visual stacks, an enlarged version of a head window of the first visual stack and an enlarged version of a head window of the second visual stack.

6. The method of claim 1, wherein two windows have the particular relationship if the computing device opened one of the two windows in response to an indication of additional user input directed to the other one of the two windows.

7. The method of claim 1, wherein two windows have the particular relationship if the two windows contain related subject matter.

8. The method of claim 1, further comprising:
   outputting, by the computing device, for display, the first arrangement of the set of windows organized into the at least two visual stacks without including the visual indication of the first window;
   while the first arrangement of the set of windows organized into the at least two visual stacks is output for display without the visual indication of the first window, receiving, by the computing device, the indication of the user input associated with the second window.

9. The method of claim 1, further comprising:
   further responsive to determining that the first window has the particular relationship with the second window, outputting, by the computing device, for display, a visual indication of the second window, wherein the visual indication of the first window and the visual indication of the second window visually differentiate the first window and the second window from the other windows from the first stack and other windows from the second stack that do not have the particular relationship with the first window and the second window.

10. The method of claim 1, wherein the visual indication of the first window comprises a textual label that indicates that the first window has the particular relationship with the second window.

11. The method of claim 1, wherein the visual indication of the first window visually differentiates the first window from the other windows from the first stack that do not have the particular relationship with the second window by virtue of the first window being displaced within the first stack relative to each of the other windows in the first stack that does not have the particular relationship with the second window.

12. The method of claim 1, wherein the characteristic is recentness of use of the set of windows.

13. The method of claim 1, wherein the second stack includes additional windows from the second stack having the particular relationship with the second window in addition to other windows from the second stack not having the particular relationship with the second window, the method further comprising:
   responsive to receiving the indication of the user input associated with the second window, outputting, by the computing device, for display, the second stack such that the second stack only includes the second window and the additional windows having the particular relationship with the second window.

14. A computing device comprising one or more processors configured to:
   output, for display, a first arrangement of a set of windows organized into at least two visual stacks, wherein:
      each respective visual stack from the at least two visual stacks comprises a respective subset of the set of windows sequenced based on a characteristic,
      a first stack from the at least two visual stacks comprises a first window from the set of windows, and a second stack from the at least two visual stacks comprises a second window from the set of windows, and
      the second stack is separate from the first stack;
   determine that the first window has a particular relationship with the second window, wherein the particular relationship is not based on the characteristic;

receive an indication of a user input associated with the second window; and responsive to determining that the first window has the particular relationship with the second window and responsive to receiving the indication of the user input associated with the second window, output, for display, a second arrangement of the set of windows organized into the at least two visual stacks, the second arrangement including a visual indication of the first window that visually indicates that the first window has the particular relationship with the second window and visually differentiates the first window from other windows from the first stack that do not have the particular relationship with the second window from the second stack, wherein the visual indication of the first window tilts the first window relative to each of the other windows in the first stack that do not have the particular relationship with the second window.

15. The computing device of claim 14, wherein the one or more processors are further configured to:

designate the second window as a head window of the second stack; and responsive to designating the second window as the head window of the second stack, determine whether the first window has the particular relationship with the second window.

16. The computing device of claim 15, wherein the one or more processors are further configured to responsive to receiving an indication of additional user input, output, for display, in place of the second stack, an enlarged version of the head window.

17. A non-transitory computer-readable data storage medium having instructions stored thereon that, when executed by one or more processors of a computing device, cause the computing device to:

output, for display, a first arrangement of a set of windows organized into at least two visual stacks, wherein:

each respective visual stack from the at least two visual stacks comprises a respective subset of the set of windows sequenced based on a characteristic, a first stack from the at least two visual stacks comprises a first window from the set of windows, and a second stack from the at least two visual stacks comprises a second window from the set of windows, and the second stack is separate from the first stack;

determine that the first window has a particular relationship with the second window, wherein any two windows in the set of windows have the particular relationship if the computing device opened one of the two windows in response to an indication of user input directed to another one of the two windows; and responsive to determining that the first window has the particular relationship with the second window and responsive to receiving an indication of a user input associated with the second window, output, for display, a second arrangement of the set of windows organized into the at least two visual stacks, the second arrangement including a visual indication of the first window that visually indicates that the first window has the particular relationship with the second window and visually differentiates the first window from other windows from the first stack that do not have the particular relationship with the second window from the second stack, wherein the visual indication of the first window tilts the first window relative to each of the other windows in the first stack that do not have the particular relationship with the second window.

* * * * *